US009985669B2

(12) United States Patent
Kazmi et al.

(10) Patent No.: US 9,985,669 B2
(45) Date of Patent: *May 29, 2018

(54) MITIGATING SIGNAL INTERFERENCE IN A WIRELESS NETWORK

(71) Applicant: Telefonaktiebolaget LM Ericsson (publ), Stockholm (SE)

(72) Inventors: Muhammad Kazmi, Bromma (SE); Chrysostomos Koutsimanis, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/240,618

(22) Filed: Aug. 18, 2016

(65) Prior Publication Data
US 2016/0359509 A1 Dec. 8, 2016

Related U.S. Application Data

(63) Continuation of application No. 14/892,255, filed as application No. PCT/SE2014/050635 on May 22, 2014, now Pat. No. 9,425,839.
(Continued)

(51) Int. Cl.
*H04B 1/10* (2006.01)
*H04B 15/00* (2006.01)
(Continued)

(52) U.S. Cl.
CPC .............. *H04B 1/10* (2013.01); *H04J 11/005* (2013.01); *H04W 52/244* (2013.01); *H04W 84/045* (2013.01); *H04W 88/02* (2013.01)

(58) Field of Classification Search
CPC ...... H04B 1/10; H04J 11/005; H04W 52/244; H04W 84/045; H04W 88/02
See application file for complete search history.

(56) References Cited

U.S. PATENT DOCUMENTS 6,172,969 B1    1/2001  Kawakami
9,425,839 B2 *  8/2016  Kazmi ............... H04W 52/244
(Continued)

FOREIGN PATENT DOCUMENTS

RU       2 369 964 C2    12/2005

OTHER PUBLICATIONS

Decision to Grant issued by the Russian Federation for Application No. 2015154889 (PCT/SE2014/050635)—dated Jun. 1, 2017.
(Continued)

*Primary Examiner* — Nguyen Vo
(74) *Attorney, Agent, or Firm* — Baker Botts, LLP

(57) ABSTRACT

A method, communication apparatus, and computer program product is provided for mitigating interference experienced by a wireless communication device, WCD (102). The interference is caused by signals transmitted by an interfering node (106). The communication apparatus determines information related to the interfering node (106). The communication apparatus selects, based at least in part on the determined information related to the interfering node (106), a WCD receiver configuration from a set of available WCD receiver configurations. The set of available WCD receiver configurations comprises i) a first WCD receiver configuration that mitigates only interference caused by physical signals transmitted by the interfering node (106) and ii) a second WCD receiver configuration that mitigates only interference caused by physical channels transmitted by the interfering node (106).

19 Claims, 8 Drawing Sheets

Related U.S. Application Data

(60) Provisional application No. 61/826,295, filed on May 22, 2013.

(51) Int. Cl.
　　　*H04W 52/24*　　(2009.01)
　　　*H04J 11/00*　　(2006.01)
　　　*H04W 88/02*　　(2009.01)
　　　*H04W 84/04*　　(2009.01)

(56) References Cited

U.S. PATENT DOCUMENTS

| | | |
|---|---|---|
| 2005/0031060 A1 | 2/2005 | Thomas |
| 2008/0219325 A1 | 9/2008 | Sambhwani |
| 2010/0008282 A1 | 1/2010 | Bhattad |
| 2012/0082022 A1 | 4/2012 | Damnjanovic et al. |
| 2012/0189083 A1 | 7/2012 | Reial |
| 2013/0163529 A1 | 6/2013 | Chen |
| 2014/0128115 A1 | 5/2014 | Siomina |
| 2014/0233457 A1 | 8/2014 | Koutsimanis |
| 2015/0256359 A1 | 9/2015 | Wang |
| 2015/0264610 A1 | 9/2015 | Bhattad |
| 2015/0373569 A1 | 12/2015 | Hwang |

OTHER PUBLICATIONS

3GPP TSG-RAN Meeting #59; Vienna, Austria; Source: Ericsson; Title; New Study Item proposal; CRS Interference Mitigation for Homogenous Deployments (RP-130393); Feb. 26-Mar. 1, 2013.

3GPP TSG RAN Meeting #59; Vienna, Austria; Source: MediaTek, Renesas Mobile Europe, Broadcom Corporation; Title: Study on Network-Assisted Interference Cancellation and Suppression for LTE (RP-130404); Feb. 26-Mar. 1, 2013.

PCT Notification of Transmittal of the International Search Report and the Written Opinion of the International Searching Authority, or the Declaration for International application No. PCT/SE2014/050635; dated Sep. 22, 2014.

PCT International Preliminary Report on Patentability for International application No. PCT/SE2014/050635; dated May 8, 2015.

Extended European Search Report for Application No. EP 14 80 0511—dated Dec. 16, 2016.

Communication Pursuant to Rules 70(2) and 70a(2) EPC for Application No./Pat. No. 14800511.9-1874 /3000181 PCT/SE2014050635—dated Jan. 9, 2017.

* cited by examiner

MITIGATING SIGNAL INTERFERENCE IN A WIRELESS NETWORK

PRIORITY

This application is a continuation of U.S. application Ser. No. 14/892,255, filed on Nov. 19, 2015, entitled "Mitigating Signal Interference In A Wireless Network" which is a U.S. National Stage Filing under 35 U.S.C. § 371 of International Patent Application Serial No. PCT/SE2014/050635 filed May 22, 2014, and entitled "Mitigating Signal Interference In A Wireless Network" which claims priority to U.S. Provisional Patent Application No. 61/826,295 filed May 22, 2013, both of which are hereby incorporated by reference in their entirety.

TECHNICAL FIELD

This disclosure relates to methods, apparatuses, systems, computer programs, and computer program products for mitigating signal interference in a wireless network, such as a wireless cellular network.

BACKGROUND

I. Interference in Wireless Networks

Inter-cell interference can be experienced by a wireless communication device (WCD) such as a user equipment (UE) on the downlink and by a base station on the uplink. To address this interference, Inter-cell Interference Coordination (TCIC), Enhanced ICIC (eCIC) and further eICIC (FeICIC) techniques have been developed in 3GPP. The eICIC and FeICIC are time domain schemes that enable interference mitigation by the virtue of resource partitioning in the time domain between an aggressor node that is a source of the interference and a victim node that receives the interference. These schemes partly or fully mitigate the interference experienced by a WCD being served by the victim node or, more specifically, by the receiver of the WCD, which may receive both a desired signal from the victim node and an interfering signal from the aggressor node.

In the time domain eICIC or FeICIC schemes, the subframe utilization across different cells is coordinated in time through backhaul signaling (e.g., over the X2 interface between the base station of two cells). The subframe utilization is expressed in terms of a time domain pattern of low interference subframes or "low interference transmit pattern." Examples include Almost Blank Subframe (ABS) patterns. The Almost Blank Subframes (ABSs) are configured in an aggressor node (e.g., a macro node) and are used to protect resources in subframes in a victim node (e.g., a pico node) receiving strong inter-cell interference. A base station that is serving a UE or other WCD can signal one or more measurement patterns to inform the UE about the resources or subframes which the UE should use for performing measurements on a target victim node (e.g., the serving pico node and/or neighbouring pico nodes).

The schemes are also applicable to other specific types of deployment scenarios such as CoMP, multipoint operation, multiflow operation, multi-carrier deployment, or any combination of these scenarios. Such scenarios may exist in both homogeneous and heterogeneous networks.

II. Types of Wireless Networks

A. Homogeneous Network

A homogeneous network is a 1-tier system comprising a single layer of radio network nodes (e.g., all nodes that are high power nodes (HPNs) such as wide area base stations serving macro cells). In another example, a homogeneous network may also comprise only low power nodes (LPNs) (e.g., local area base stations serving pico cells). When different cells of a homogenous network are under similar levels of load, a user equipment (UE) typically receives equally strong signals from the serving node (which may also be a measured node) and from the closest neighboring nodes, especially when the UE is located in the border region between the two cells. Therefore, in a homogeneous network, resource partitioning between serving and neighboring cells for the purpose of inter-cell interference mitigation is not as critical as in a heterogeneous network.

B. Heterogeneous Network

The heterogeneous network comprises 2 or more layers where each layer is served by one type of base station (BS) class or type. An example of a heterogeneous network includes nodes of different power classes, such as a set of high power nodes and low power nodes in a geographical region. A BS power class is defined in terms of maximum output power and other radio requirements (e.g., frequency error etc.) which depend upon the maximum output power. The maximum output power, Pmax, of the base station is the mean power level per carrier measured at the antenna connector in a specified reference condition. The rated output power, $P_{RAT}$, of the BS for different BS power classes is expressed in Table 0.

TABLE 0

Base Station rated output power in LTE (FDD and TDD)

| BS class | $P_{RAT}$ |
|---|---|
| Wide Area BS | - (see note) |
| Medium Range BS | <+38 dBm |
| Local Area BS | ≤+24 dBm |
| Home BS | ≤+20 dBm (for one transmit antenna port) |
|  | ≤+17 dBm (for two transmit antenna ports) |
|  | ≤+14 dBm (for four transmit antenna ports) |
|  | <+11 dBm (for eight transmit antenna ports) |

NOTE:
There is no upper limit for the rated output power of the Wide Area Base Station.

A heterogeneous network, such as cells in a co-channel scenario, brings more challenges in terms of managing interference. The interference can be addressed using the ICIC, eICIC, and FeICIC techniques described above.

II. Interference Mitigation

Some nodes include an advanced receiver (also called an enhanced receiver) for performing interference mitigation. Examples of the advanced receiver include an interference mitigation receiver, interference cancellation receiver, interference suppression receiver, interference rejection receiver, interference aware receiver, and interference avoidance receiver, and some of these terms are used interchangeably. Interference cancellation or suppression by such advanced receivers can lead to the elimination of the interference, in which case the interference is completely cancelled, whereas in other cases the impact of interference on the useful signal is reduced. The advanced receiver can be used at a wireless communication device and/or at a radio network node (e.g. a BS, a relay, etc.) for improving the reception of the received, wanted radio signals.

A well-known example of an advanced receiver is a Minimum Mean Square Error Interference Rejection Combining (MMSE-IRC) receiver. An example of a more sophisticated advanced receiver is the Minimum Mean Square Error-turbo Interference Cancellation (MMSE-turbo IC) receiver, which is capable of performing non-linear subtractive-type interference cancellation, which can be used to further enhance system performance. Even the use of multiple receive antennas at a receiver can be considered an advanced receiver.

III. Mechanisms to Trigger Interference Mitigation of Physical Signals

For co-channel heterogeneous network deployment in release 11, a large cell range expansion (CRE) of up to 9 dB is supported. When a UE is in the CRE region of a low power node (LPN), the received signal at the UE can be interfered by, e.g., up to 2 strong macro aggressor nodes. In this scenario the received signal to interference plus noise ratio (SINR) (e.g., SCH Ês/Iot or CRS Ês/Iot) at the UE when the UE is served by a LPN and is located in the CRE region of the serving cell can be very low (e.g., down to −11 dB). In order to correctly detect received signals, the UE in the CRE region has to mitigate (e.g., reduce or cancel) interference on certain physical signals (e.g., on a CRS signal).

To facilitate UE interference mitigation of these physical signals, a radio network node can assist the UE by providing to the UE assistance information, such as a list of assistance information (e.g., physCellID, antennaPortsCount, mbsfn-SubframeConfigList) as specified in TS 36.331. When a physical signal, such as a received CRS, carries assistance information that is for a cell with CRS colliding with that of the CRS of the cell being measured or to be measured, the UE may use the CRS assistance information to mitigate CRS interference on the subframes indicated by the following parameters specified in TS 36.331: measSubframePattern-PCell, measSubframePatternConfigNeigh and csi-MeasSubframeSet1.

As another example, the CRS assistance information contains a list of aggressor cells, their antenna port information, and also their multi-broadcast single-frequency network (MBSFN) configuration.

It has also been specified in TS 36.133 v11.2.0 that the UE shall meet the measurement requirements when the UE is provided with CRS assistance information, which is valid over the measurement period.

The reception of information from physical signals (e.g., CRS assistance information) at the UE is used by the UE to perform the interference cancellation on physical signals (e.g., CRS, etc.). However, in heterogeneous network deployment, the UE typically applies interference cancellation on restricted subframes indicated in measurement patterns, which are signaled to the UE by the serving radio node via RRC protocol.

SUMMARY

This disclosure relates to a method performed by a communication apparatus for mitigating interference experienced by a wireless communication device (WCD), where the interference may be caused by signals transmitted (e.g., broadcasted) by an interfering node. In some cases, the interference is caused by a physical signal from the interfering node. In some cases, the interference is caused by a physical channel from the interfering node. In general, a physical signal refers to a signal that is generated at a physical layer, and that does not carry information from higher layers (e.g., does not carry information from L2 and L3 layers), while a physical channel refers to a signal that carries information originating from a higher layer.

The communication apparatus can facilitate the interference mitigation by selecting an appropriate receiver configuration to be used by the WCD. In some cases, the communication apparatus is the WCD itself. In some cases, the communication apparatus is another node.

The same WCD (e.g., UE) may support multiple interference cancellation capabilities in terms of types of signals (e.g., physical signal or physical channel) whose interference at the WCD receiver can be mitigated. For example, a WCD may be capable of mitigating interference caused by a physical signal (e.g. a reference signal) and also be capable of mitigating interference caused by a physical channel (e.g., a data channel) transmitted by an interfering node. In some instances, the WCD may even be capable of mitigating interference caused by a plurality of physical signals and a plurality of physical channels (e.g., a data channel such as PDSCH, control channels such as PDCCH/PHICH, etc.).

While a WCD (e.g., UE) supporting multiple interference mitigation (IM) receiver configurations (e.g. a physical signal IM receiver and a physical channel IM receiver) may use all or several receivers to mitigate multiple forms of interference (e.g., physical signal interference and physical channel interference) all the time, this approach can be resource-intensive. More particularly, mitigating both physical channel interference and physical signal interference can increase processing at the WCD, drain WCD battery and thus shortens its battery life, and increase WCD complexity and hardware cost (e.g. increased memory requirements). This approach does not lead to performance gain (e.g., in terms of user throughput) in all scenarios. This approach may also require a network node to frequently provide the assistance information to assist the IM receiver at the WCD, which in turn may lead to complexity in the network node, increased signaling overhead on the radio interference, and also increased signaling overhead between network nodes for obtaining the assistance information.

This disclosure discusses methods enabling the use of the most appropriate receiver configuration at a WCD (e.g., UE) under given conditions (e.g., scenarios). For example, the selection of an appropriate receiver configuration can be based on a minimum set of conditions, such as physical channel load and a relationship between interfering physical signals.

In a scenario in which the physical channel load on the interfering node is low, the interfering node may generate a low or otherwise acceptable amount of physical channel interference at the WCD. In that scenario, the WCD can conserve resources by not using a receiver configuration that mitigates physical channel interference. That receiver configuration may mitigate only physical signal interference, or may be a baseline receiver configuration that performs no interference mitigation.

In a scenario in which physical signals from an interfering node and from a WCD's serving node are shifted in time or frequency, the interfering node may generate a low or otherwise acceptable amount of physical signal interference. In some instances, the WCD can conserve resources by not using a receiver configuration that mitigates physical signal interference. That receiver configuration may mitigate only physical channel interference, or may be a baseline receiver configuration that performs no interference mitigation. In some instances, the amount of WCD resources needed for mitigating physical signal interference may be sufficiently low to allow the WCD to be able to afford to perform physical signal interference mitigation even when the physical signal interference is low. The amount of WCD resources needed for mitigating physical channel interference, on the other hand, may be sufficiently high such that the WCD should not perform physical channel interference when the physical channel interference is low.

In a scenario in which the physical channel load is high and the physical signals from a serving node and interfering node are not shifted in time or frequency, the WCD may then use a receiver configuration that mitigates both physical channel interference and physical signal interference. Although this receiver configuration may require more WCD resources, the increased physical signal interference and physical channel interference may justify the use of such resources.

In one embodiment, there is provided a method performed by a communication apparatus for mitigating interference experienced by a wireless communication device, WCD, and caused by signals transmitted by an interfering node (e.g., a neighbor node). The method comprises the communication apparatus determining information related to the interfering node. It further comprises the communication apparatus selecting, based at least in part on the determined information related to the interfering node, a WCD receiver configuration from a set of available WCD receiver configurations. The set of available WCD receiver configurations comprises:
  i) a first WCD receiver configuration that mitigates only interference caused by physical signals transmitted by the interfering node and
  ii) a second WCD receiver configuration that mitigates only interference caused by physical channels transmitted by the interfering node.

In some instances, the set of WCD receiver configurations further comprises a third WCD receiver configuration that mitigates interference caused by both physical signals and physical channels transmitted by the interfering node.

In some instances, determining information related to the interfering node includes one or more of:
  i) determining a relationship between a first signal transmitted by a radio network node and a second signal transmitted by the interfering node; and
  ii) determining a load of the interfering node.

In some instances, the method further comprises the communication apparatus determining information related to the WCD. The information related to the WCD comprises one or more of:
  i) information related to a location of the WCD within a cell,
  ii) information related to an amount of power consumed by the WCD,
  iii) information related to the status of a battery that provides power to the WCD, and
  iv) information related to low interference physical resources configuration.

The selecting of the WCD receiver configuration may be based at least in part on the determined information related to the WCD.

In some instances, the communication apparatus is the WCD (e.g., a UE).

In some instances, the communication apparatus transmits to a network node information about a first selection of a WCD receiver configuration for approval or alteration by the network node.

In some instances, the communication apparatus transmits capability information to the network node. The capability information may indicate that the WCD is capable of selecting between at least the first WCD receiver configuration and the second WCD receiver configuration.

In some instances, the communication apparatus is a network node. The network node may provide to the WCD assistance information to facilitate the mitigating of the interference by the WCD.

In some instances, the interfering node is configured to process information in at least a first logical layer that is a physical layer and a second logical layer that is a higher logical layer than the physical layer. The physical signal includes a signal carrying information that originates from the physical layer. The physical channel includes a signal carrying information that originates from the higher logical layer.

In one embodiment, there is provided a method performed by a UE (or other type of WCD), which is served by a serving node, for mitigating interference to a signal transmitted by a second node (e.g., the serving node or a neighbor node), where the interference is caused by an interfering signal transmitted by an interfering node. The method comprises:
  (i) evaluating a plurality of conditions (such as, but not limited to, conditions related to a relationship between signals transmitted by and/or received from the second node and the interfering node);
  (ii) selecting one of the following receiver configurations based on the evaluated conditions: a) a first receiver configuration for mitigating interference caused by one or more types of only physical signals transmitted by the interfering node; b) a second receiver configuration for mitigating interference caused by one or more types of only physical channels transmitted by the interfering node; and c) a third receiver configuration for mitigating interference caused by one or more types of both physical signals and physical channels transmitted by the interfering node; and
  (iii) using the selected receiver configuration for at least one of: a) mitigating interference caused by the interfering node to the signal transmitted by the second node; and b) signaling the information related to the selected receiver configuration to the serving node.

In one embodiment, there is provided a method in a first node (e.g., a serving cell's serving node) serving a UE (or other type of WCD) and assisting it to mitigate interference caused by signal transmitted by an interfering node. The method comprises:
  (i) receiving from the UE information related to one of the following receiver configurations selected or recommended by the UE for mitigating interference:
    a) a first receiver configuration for mitigating interference caused by one or more types of only physical signals transmitted by the interfering node;
    b) a second receiver configuration for mitigating interference caused by one or more types of only physical channels transmitted by the interfering node; and
    c) a third receiver configuration for mitigating interference caused by one or more types of both physical signals and physical channels transmitted by the interfering node; and
  (ii) sending assistance information assisting the selected or recommended receiver configuration of the UE, thereby enabling the UE to mitigate the interference from the interfering node.

In one embodiment, there is provided a method performed by a serving node serving a UE (or other type of WCD). The method comprises:
  (i) evaluating plurality of conditions related to a relationship between signals transmitted by and/or received from a second node (e.g., the serving node or another node) and an interfering node;

(ii) selecting, based on the evaluated conditions, a receiver configuration from a set of receiver configurations;

(iii) configuring the UE with the selected receiver configuration; and (iv) sending assistance information assisting the selected receiver configuration of the UE, thereby enabling the UE to mitigate the interference from the interfering node.

In one embodiment there is provided a method performed by a UE (or other type of WCD). The method comprises the UE signaling to a network node the UE's capability for selecting any one of at least the above three receiver configurations for mitigating interference according to one or more conditions governed by one or more pre-defined rules and/or indication received from the network node.

DETAILED DESCRIPTION

This disclosure discloses, among other things, a method of selecting, based on a plurality of conditions, one of several types of WCD receiver configurations (e.g., UE receiver configurations) for mitigating interference caused by an interfering node to a signal received at the WCD. The interference can come from a network node, which can be a serving node or a non-serving node (e.g. neighbor node of the serving node). In the former case, multiple signals from the same serving node may interfere with each other. In the examples below, a discussion with respect to a UE may apply to any other type of WCD.

In an embodiment, three main types of the WCD receiver configurations are configured to mitigate, respectively, physical signal interference, physical channel interference, and both types of interference. They include:

i) a first WCD receiver configuration that uses a receiver type that mitigates interference caused by one or more types of only physical signals transmitted by the interfering node;

ii) a second WCD receiver configuration that uses a receiver type that mitigates interference caused by one or more types of only physical channels transmitted by the interfering node; and iii) a third WCD receiver configuration that uses receiver types that mitigate interference caused by one or more types of both physical signals and physical channels transmitted by the interfering node.

The selection of the receiver configuration can be based on a condition, such as on a load of the interfering node and on whether signals from the serving node and the interfering node are shifted relative to each other. The condition can indicate, for example, that interference from a physical channel transmitted by the interfering node is tolerable. As a result, a receiver configuration can be selected to mitigate only interference caused by physical signals from the interfering node. In some cases, the mitigation of physical signal interference may consume less resources (e.g., processing time, battery power) than the mitigation of physical channel interference. In an embodiment, the selection is based on one or more additional conditions.

While some embodiments in this disclosure discuss a selection between receiver configurations that mitigate different types of interference, in some embodiments no interference mitigation receiver configuration is selected (e.g., no advanced receiver configuration for inter-cell interference mitigation is selected, and a baseline receiver configuration is selected).

Figure 1A:
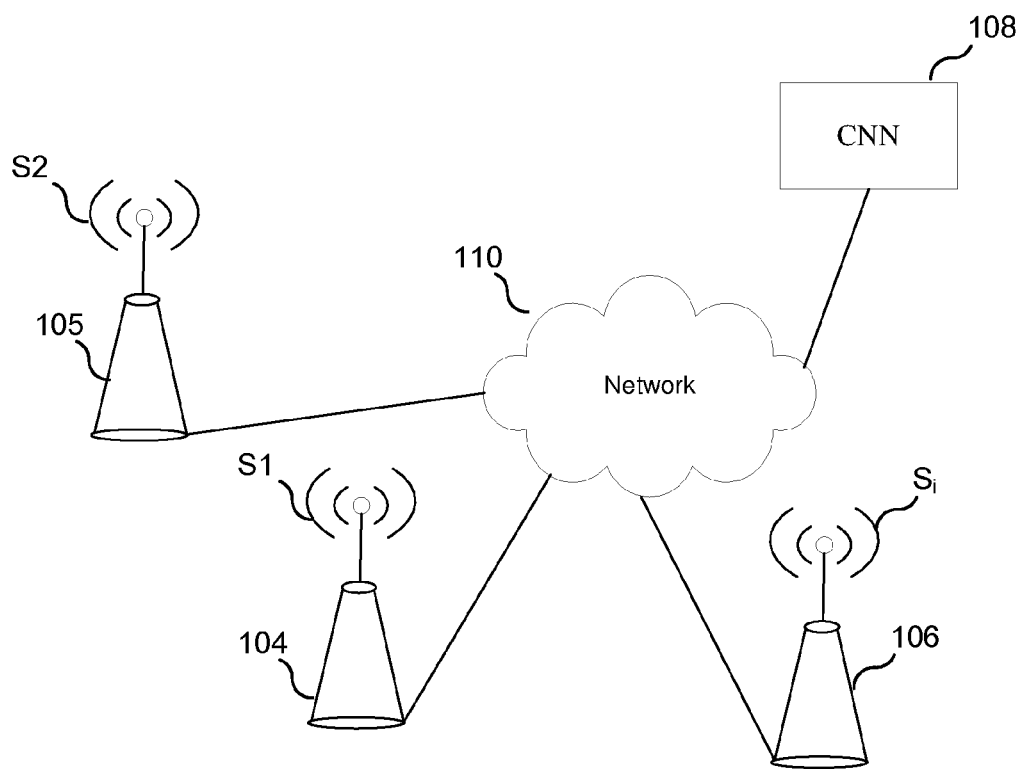
FIG. 1A illustrates a network for performing interference mitigation, according to an aspect of the present disclosure.

Referring now to FIG. 1A, the figure illustrates a communication system 100. System 100 includes at least: a wireless communication device (WCD) (e.g., UE 102), radio network nodes (e.g., a first radio network node (RNN) 104 and a second RNN 106), a core network 110, and a core network node (CNN) 108. Signals from RNN 104 and RNN 106 may interfere with each other, and this interference may be experienced at WCD 102. System 100 may also include a third RNN 105, which may serve a target cell (e.g., in handover situations). A WCD may desire to measure a signal from RNN 105, and this signal may also receive interference from RNN 106. For the sake of illustration we can assume the following: RNN 104 is the RNN (e.g., eNB) that is currently serving UE 102 (i.e., RNN 104 is a serving node); RNN 106 is a node (e.g., another eNB) that produces a signal (Si) that interferes with UE 102's ability to i) receive information contained in a signal (S1) transmitted by RNN 104 and/or ii) receive information contained in a signal (S2) transmitted by RNN 105 (i.e., RNN 106 is an interfering node).

The disclosure may also refer to a signal from a cell, such as a serving cell or a neighboring cell. The serving node operates in the serving cell to provide a useful or desired signal (e.g., user data, control information, signals for performing radio measurements, etc.) to a WCD. The neighboring node operates in the neighboring cell and may output signals that are received at the WCD and that interfere with signals from the serving node.

The method of selecting the WCD receiver configuration can be performed or implemented by WCD 102 or by network node 104, 106, 108, 105 or a combination thereof. For example, the network node can recommend or mandate a receiver configuration, or can consider a first selection (e.g., a recommendation) received from the WCD and transmit an approval, denial, or second selection back to the WCD. The selected WCD receiver configuration is then used by the WCD for mitigating the interference.

Network Node:

As used herein "network node" refers to any type of network apparatus that has a transmitter for communication with a UE (or any other type of WCD), directly or indirectly. For example, a network node can be radio network node (e.g., a base station) or a core network node. More specifically, for example, the network node can be a network node (e.g., RNN 104) serving the UE, a network node (e.g., RNN 106) neighboring to the serving network node of the UE, any network node in the radio network or in the core network in a wireless communication system in which a UE or any other WCD operates. Examples of network nodes are base station (BS), multi-standard radio (MSR) radio node such as a MSR BS, eNode B, a network controller, a radio network controller, a base station controller, a relay, a donor node controlling relay, a base transceiver station (BTS), an access point (AP), a core network node (e.g. MSC, MME, etc.), O&M, OSS, SON, positioning node (e.g. E-SMLC), MDT, etc.

Wireless Communication Device:

As used herein, a wireless communication device (WCD), such as a user equipment (UE), refers to any type of communication device capable of communicating, directly or indirectly, with a network node via a radio or other wireless interface. Examples of WCDs are machine type UE or UE capable of machine to machine communication, PDA, iPAD, Tablet, mobile terminals, smart phone, laptop embedded equipped (LEE), laptop mounted equipment (LME), USB dongles, and any other wireless communication device.

Interfering Node:

As used herein, an interfering node refers to a radio network node that produces a signal that interferes with a WCD's ability to receive information transmitted by another radio network node (e.g., a radio network node serving the UE). An interfering node is also sometimes referred to as an "aggressor node." A UE that suffers from interference caused by an interfering node is sometimes referred to as a "victim UE."

The disclosure describes, among other advances, the following methods:

i) a method performed by a communication apparatus (e.g., UE 102 or network node 104, 106, 108, 105) for selecting a WCD receiver configuration;
ii) a method performed by the communication apparatus (e.g., network node 104, 106, 108, or 105) for configuring a WCD to assist in interference mitigation;
iii) a method performed by the communication apparatus (e.g., UE 102) for adapting receiver configuration; and
iv) a method performed by the communication apparatus (e.g., network node 104, 106, 108, or 105) for signaling information related to receiver configuration selection to another network node.

The Method of Selecting a WCD Receiver Configuration

The scenario for interference mitigation described herein is applicable for embodiments throughout the disclosure.

The UE 102 illustrated in FIG. 1A is equipped with at least two types of receivers: receiver type A and receiver type B. Receiver type A is capable of mitigating interference at the UE receiver caused by at least one type of physical signal transmitted by at least one interfering node. Receiver type B is capable of mitigating interference at the UE receiver caused by at least one type of physical channel transmitted by at least one interfering node.

Figure 1A:
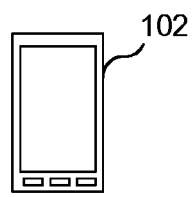
Figure 1B:
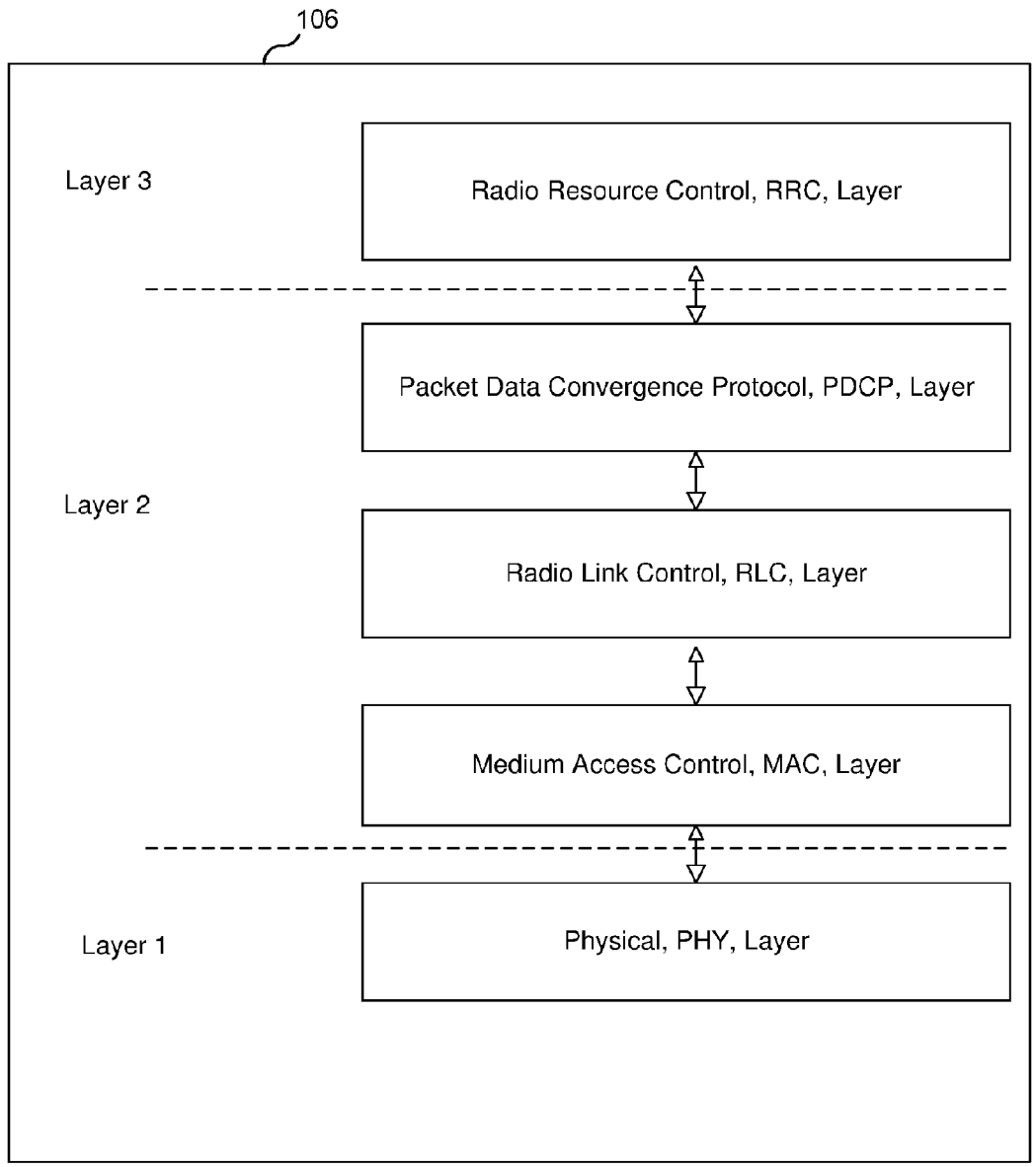
FIG. 1B illustrates layers of a network node, according to an aspect of the present disclosure.

Physical signal and physical channel are described in 3GPP TS 36.211. A physical signal comprises of a set of resource elements used by the physical layer but does not carry information originating from higher layers. As FIG. 1B illustrates, a physical signal may be generated at the PHY layer (i.e., Layer 1) of an interfering node, and does not carry information from higher logical layers such as Layer 2 and Layer 3. A physical channel, on the other hand, comprises of a set of resource elements carrying information originating from higher layers (e.g. transport channel from Layer 2, RRC message from Layer 3, etc.).

Examples of downlink physical signals include a cell-specific reference signal (CRS) or any other reference signal (RS), a primary synchronization signal (PSS), a secondary synchronization signal (SSS), an extended synchronization signal (ESS), channel state information reference signal (CSI-RS), demodulation reference signal (DMRS), positioning reference signal (PRS), multicast broadcast single frequency network reference signal (MBSFN RS), etc.

Examples of downlink physical channels include a Physical Downlink Shared Channel (PDSCH), a Physical Broadcast Channel (PBCH), a Physical Multicast Channel (PMCH), a Physical Control Format Indicator Channel (PCFICH), a Physical Downlink Control Channel (PDCCH), a Physical Hybrid ARQ Indicator Channel (PHICH), an Enhanced Physical Downlink Control Channel (EPDCCH), etc.

The WCD 102 may have a plurality of receivers that are of receiver type A and/or a plurality of receivers of receiver type B. For example, the UE may have three receivers of receiver type A, which may be capable of mitigating interference from physical signals CRS, PSS and SSS, respectively. It may also have two receivers of receiver types B for mitigating interference from physical channels PDSCH and PDCCH, respectively.

Referring back to FIG. 1, the UE 102: i) is served by RNN 104 and receives signal (S1) from the node; and ii) receives signal (S2) from RNN 105, which may be a secondary serving node or a neighboring node. The signal (S1) and/or the signal (S2) received at the UE is interfered by a signal (Si) transmitted by interfering node 106. The term 'signal' encompasses a physical signal, a physical channel, or both.

The UE may receive signals from multiple serving cells, radio links, or other communication links (e.g., in carrier aggregation, coordinated multipoint (CoMP), distributed antenna system (DAS), etc.). A desired signal can be interfered by signals transmitted by one or more interfering nodes. The signal transmitted by interfering node is also interchangeably called an interfering signal, inter-cell interference or inter-cell interfering signal, other cell interference, non-serving cell interference, other radio links interference, or other non-serving radio link interference, etc.).

Conditions for Selecting WCD Receiver Configuration:

The selection of one of the multiple UE or other WCD receiver configurations (e.g., between a configuration that uses receiver type A, a configuration that uses receiver type B, a configuration that uses both receiver type A and receiver type B, and a configuration that does not use an interference mitigation receiver type) can be performed by the WCD, by a network node, or by both. The selection can use at least a minimum set of one or more conditions. The selection procedure can be further enhanced by using additional or an enhanced set of conditions.

In instances where the network node selects the WCD receiver configuration, the network node can also configure the WCD with the selected configuration. In instances where the WCD may select the configuration, it may do so autonomously based on its own implementation principle or based on one or more pre-defined rules. A pre-defined rule or WCD implementation principle establishes mapping between the receiver configuration and the relation between at least the minimum conditions (e.g., the relation between load on physical channel(s) and relation between physical signals in measured and interfering nodes). One pre-defined rule can be implemented according to the mapping between the physical channel load and the relation between physical signals as further expressed in Table 1 and elaborated below.

In an embodiment, the WCD (e.g., UE) or the network node selects the WCD receiver configuration provided the WCD is capable of having at least one receiver of receiver type A and one receiver of receiver type B. The UE capability (e.g., its receiver types) can be obtained by the network node explicitly by acquiring the UE receiver capability information from the UE or from another node being aware of the UE receiver capability. The network node may also obtain the UE capability information implicitly by observing the UE signal reception performance and/or radio measurement results reported by the UE. For example, if the UE performance is above a threshold and/or radio measurement result is above a threshold, the network node may infer that the UE is capable of using the receiver type A and the receiver type B for receiving signals from first node under interfering signals received from another node (i.e., an interfering node). A general discussion of radio measurements is provided later in the disclosure.

In one embodiment, the minimum set of conditions upon which the receiver configuration selection is based includes load of physical channels in interfering nodes; and relationship between the physical signals transmitted by the serving node and physical signals transmitted by an interfering node. The minimum set of conditions are illustrated in Table 1:

TABLE 1

Selection of receiver configuration based on minimum conditions

| Physical channel load in interfering node | Relation between physical signals in measured and interfering nodes | |
|---|---|---|
| | Shifted physical signals | Non-shifted physical signals |
| Low load | Select $1^{st}$ WCD receiver configuration | Select $1^{st}$ WCD receiver configuration |
| Medium load | Select $1^{st}$ or $2^{nd}$ WCD receiver configuration | Select $1^{st}$ or $3^{rd}$ WCD receiver configuration |
| High load | Select $2^{nd}$ or $3^{rd}$ WCD receiver configuration | Select $3^{rd}$ WCD receiver configuration |

In the example illustrated in Table 1, the $1^{st}$ receiver configuration mitigates only interference caused by physical signals transmitted by an interfering node (e.g., a receiver of receiver type A is used), the $2^{nd}$ receiver configuration mitigates only interference caused by physical channels transmitted by the interfering node (e.g., a receiver of receiver type B is used), and the $3^{rd}$ receiver configuration mitigates interference caused by both physical signals and physical channels transmitted by the interfering node (e.g., the receiver of receiver type A and the receiver of receiver type B are used).

The table shows that in instances where physical channel load on an interfering node (e.g., load on a cell served by the interfering node) increases, interference from physical channels transmitted by the interfering node may increase. For example, the interfering node may be a base station that transmits physical channels such as RRC messages with UE's in its cell. As the number of UE's being served by the base station increases, the base station may transmit more RRC messages, which may increase the physical channel interference experienced by UEs in neighboring cells that are not being served by the base station. Thus, as physical channel load in the base station increases, UEs in neighboring cells may use a receiver configuration that mitigates interference caused by physical channels transmitted by the base station. For instance, a TIE in a neighboring cell may have available the $1^{st}$, $2^{nd}$, and $3^{rd}$ UE receiver configuration described above. In response to determining that the physical channel load in an interfering node is high, the UE may select the $2^{nd}$ receiver configuration or the $3^{rd}$ receiver configuration, which mitigates at least interference caused by physical channels transmitted by the interfering node.

The table further shows that in instances where physical signals from a serving node and physical signals from an interfering node are not shifted relative to each other, physical signal interference may increase. For example, a physical signal from a serving node and a physical signal from an interfering node may be shifted relative to each other in time or frequency to reduce interference between the two signals at a receiving UE. In instances where the physical signals are not shifted, the UE may more frequently use the $3^{rd}$ receiver configuration, which mitigates physical signal interference.

In the example illustrated in Table 1, the $1^{st}$ receiver configuration (which mitigates physical signal interference) may be selected even in conditions where physical signals from the serving node are shifted relative to physical signals from the interfering node. This selection may be used for situations where mitigation of physical signal interference consumes a sufficiently low amount of resources. For instance, certain physical signals may have a signal pattern or power spectral density that is much more static compared to physical channels. Mitigating interference from such physical signals may thus be easier and consume less processing time, battery power, or any other UE resource. Thus, in the example, a UE may be able to afford to use the $1^{st}$ receiver configuration to mitigate physical signal interference at all times. Using the second receiver configuration to mitigate physical channel interference, on the other hand, may consume more resources because physical channels are more dynamic. Thus, it may be decided that the UE should avoid consuming such resources, and should use the $2^{nd}$ or $3^{rd}$ receiver configuration only when physical channel load in the interfering node is medium or higher.

In another example, it may be decided that the UE should further conserve resources by not using the $1^{st}$ receiver configuration when physical signals from the serving node are shifted relative to physical signals from the interfering node. For instance, if the physical channel load in the interfering cell is also low, the UE may use a baseline receiver configuration that does not perform interference mitigation.

In an embodiment, other conditions may be used instead of or in addition to the physical channel load and relation of the physical signals. The additional or enhanced set of conditions may relate to one or more of the following: the UE's (or, more generally, the WCD's) location in a cell; the UE's battery life, or the UE's power consumption.

Assessment of Conditions

The conditions that the network node assesses to decide whether to apply interference mitigation with a selected UE receiver configuration are further elaborated in this section. A summary of the relationship between the conditions used for selecting between possible UE receiver configurations is shown above in table 1.

Thus, the UE or the network node can assess certain conditions (as described further below), establish a relationship between the determined conditions, and uses the mapping table 1 to select a receiver configuration and corresponding UE receiver type.

Methods in the UE and network node for determining the conditions, such as physical channel load, the relationship between physical signals, location of a UE, and other conditions are described below.

Physical Channel Load or Interference Level in Interfering Nodes:

This condition can be determined through any metric that can indicate the load from transmitting signals by one or more physical channels at the one or more interfering node and/or signal quality received at the UE (or other type of WCD) from the one or more interfering nodes. The interference level refers to the interference experienced by the UE at its receiver caused by the interfering node. Examples of the metrics include radio node transmit power, received signal quality at the UE (e.g. RSRQ measured on interfering node), utilization of radio resources (e.g. usage of physical resource blocks, resource element, etc.) at the radio node, transmission intensity of data (e.g., PDSCH) and/or control channel (e.g. PDCCH, PHICH, etc.) from the interfering node, etc. The network node can obtain one or more of these measurements from the interfering node and/or from the UE (e.g. RSRQ, CSI reports, SINR, etc.).

The signal load or interference level can be estimated over a certain time period (e.g., 200 ms). The determined load or interference can then be expressed in one of L pre-defined levels (e.g., in 2 levels such as low and high or 3 levels such as low, medium, high or in 5 levels such as very low, low, medium, high and very high, or in any other number of levels). In one example, a low load may correspond to the load of one or more physical channels (e.g. PDSCH, PDCCH, PHICH etc) occupying less than 30% of resources (e.g. less than 30% of available physical resource blocks (PRBs) in the interfering cell) and a high load may correspond to the load of one or more physical channels occupying 30% or more of resources. In another example, low load corresponds to the average resource utilization (e.g. PRB usage) or transmit power usage in an interfering node being below 30%, whereas 30% or more corresponds to high load. Similarly, in a 3-level metric system for measuring physical channel load or interference, the low, medium, and high loads may correspond to average resource usage of less than 30%, from 30% to 70%, and more than 70%, respectively. In yet another example, the low, medium, and high load in an interfering node can be determined based on signal quality at the UE (e.g. RSRQ, SINR, etc) corresponding to less than −15 dB, from −15 dB to −10 dB, and more than −10 dB, respectively.

In yet another example, the low, medium, and high interference levels can be determined based on the activity of a set of the strongest aggressor cells (e.g., the first two strongest aggressor cells).

For instance, low interference might correspond to the case where none of the two strongest aggressor cells are transmitting physical channels. Medium interference might correspond to the case where only the second strongest aggressor is transmitting physical channels, while high interference might correspond to the case where both strongest aggressor cells are transmitting physical channels. The condition may involve checking all interfering nodes or the N strongest interfering nodes of the UE. In case of multiple interfering nodes, the load level can be determined based on a statistical function e.g., average of loads in all cells, xth percentile of load in all cells, etc.

Physical Signal Relation Between Serving/Measured and Interfering Nodes:

In one example, this condition refers to the relation between a time and/or frequency of the physical signals such as reference signals used at the serving cell and a time and/or frequency of the physical signals at at least one interfering node. For example, this condition can indicate whether a certain type of physical signals such as CRS transmitted by the serving or measured cell and interfering cell are colliding or non-colliding. The collision of the CRS occurs when the REs containing the CRS in the serving and interfering cells overlap in both time and frequency. The collision of the CRS can be avoided by shifting the CRS in frequency domain between serving and interfering nodes. This may be done during network planning and is therefore not changed frequently. The information about physical signal relation between different cells in an area may be pre-determined or provided to the network node by another node (e.g., by a configuring node such as OSS, O&M, SON node, etc.) The network node based on stored or acquired information from another node determines whether the physical signals (e.g. CRS) used in the serving and interfering nodes of the UE are are colliding or not. The UE can also determine the relation between physical signals used in the serving/measured cell and interfering cell during cell search procedure or any type of measurement procedure (e.g., when performing RSRP measurements) and can store the relation between these cells. The colliding and non-colliding physical signals (e.g., CRS) can be expressed mathematically using mod X operation as explained with few examples:

In case of single antenna port implementation in a radio network node, there can be 6 possible frequency shifts to avoid CRS collision. As an example, if CRS used in cell 1 and cell 2 collide, then the relation between their physical cell IDs (PCI) #1 and #2 can be expressed as mod 6 operation. In another example, if CRS used in cell 2 and cell 4 do not collide, then the relation between their physical cell IDs (PCI) #3 and #4 can also be expressed as mod 6 operation. This is expressed mathematically as follows:

Colliding CRS between cell 1 and cell 2 for single antenna port: $(PCI_{cell1} - PCI_{cell2}) \bmod 6 = 0$ Non-colliding CRS between cell3 and cell4 for single antenna port: $(PCI_{cell3} - PCI_{cell4}) \bmod 6 \neq 0$ In case of MIMO (e.g., two antennas) in the radio network node, 3 possible frequency shifts to avoid CRS collision are possible. As an example, if CRS used in cell 1 and cell 2 collide then the relation between their physical cell IDs (PCI) #1 and #2 can be expressed as a mod 3 operation. In another example, if CRS used in cell 2 and cell 4 do not collide then the relation between their physical cell IDs (PCI) #3 and #4 can also be expressed as mod 3 operation. These examples are also expressed mathematically below:

Colliding CRS between cell 1 and cell 2 for 2-antenna port: $(PCI_{cell1} - PCI_{cell2}) \bmod 3 = 0$ Non-colliding CRS between cell 3 and cell 4 for 2-antenna port: $(PCI_{cell3} - PCI_{cell4}) \bmod 3 \neq 0$ Selection Based on Additional Conditions In an embodiment, the minimum conditions used for selecting the UE receiver configuration are the physical channel load and the relation between physical signals from the serving and interfering nodes. The UE or network node may further evaluate one or more additional or supplementary conditions in order to further enhance the selection of the UE receiver configuration for applying the interference mitigation. For example, the UE or network node can use one or a plurality of pre-defined lookup tables mapping the evaluated additional one or more conditions and the UE receiver type to be selected.

Non-limiting examples of these additional conditions are: UE location in the serving cell; UE battery life or power consumption; Low Interference time-frequency resource configuration (e.g., restricted subframe pattern in heterogeneous network).

Non-limiting examples of mapping one of the additional conditions to the UE receiver configuration or of mapping a combination of the additional conditions to the UE receiver configuration to be selected are shown in tables 2, 3, 4 and 5. Depending upon the value of the evaluated additional conditions, the look up tables in some embodiments may also result in a selection that uses no UE receiver configuration for interference mitigation. For example, if the UE is close to serving cell and/or UE battery life is very low (e.g., less than 20%), then a decision may be made for the UE to not apply interference mitigation to mitigate interference caused by one or more interfering nodes.

TABLE 2

Selection of receiver configuration based on one
additional criterion (UE location)
UE location in serving cell

| Inner part of cell | Cell edge | Cell Range Expansion (CRE) zone |
|---|---|---|
| No selection of $1^{st}$, $2^{nd}$ or $3^{rd}$ receiver configuration. | Follow mapping based on minimum conditions (e.g., follow table 1). | Select $1^{st}$ receiver configuration. For determine whether the $2^{nd}$ or $3^{rd}$ receiver configuration should be selected, follow mapping based on minimum conditions (e.g., table 1). |

TABLE 3

Selection of receiver configuration based on one additional
criterion (UE battery life or power consumption)
UE battery life or power consumption

| Very Low | Low | Medium or high |
|---|---|---|
| No selection of $1^{st}$, $2^{nd}$ or $3^{rd}$ receiver configuration | Select $1^{st}$ receiver configuration or follow mapping based on minimum conditions (e.g., table 1). | Follow mapping based on minimum conditions (e.g., table 1). |

TABLE 4

Selection of receiver configuration based
on combination of additional conditions

| UE battery life or power consumption | UE location in serving cell | | |
|---|---|---|---|
| | Inner part of cell | Cell edge | CRE zone |
| Very Low | No selection of $1^{st}$, $2^{nd}$ or $3^{rd}$ receiver configuration | No selection of $1^{st}$, $2^{nd}$ or $3^{rd}$ receiver configuration | |
| Medium | No selection of $1^{st}$, $2^{nd}$ or $3^{rd}$ receiver configuration | Follow mapping based on minimum conditions (e.g., table 1). | Select $1^{st}$ receiver configuration. For $2^{nd}$ or $3^{rd}$ receiver configuration follow mapping based on minimum conditions (e.g., table 1). |
| High | No selection of $1^{st}$, $2^{nd}$ or $3^{rd}$ receiver configuration or select $1^{st}$ UE receiver configuration | Follow mapping based on minimum conditions (e.g., table 1). | Select $1^{st}$ receiver configuration. For determining whether $2^{nd}$ or $3^{rd}$ receiver configuration should be selected, follow mapping based on minimum conditions (e.g., table 1). |

TABLE 5

Selection of receiver configuration based on
combination of additional conditions

| UE battery life or power consumption | UE location in serving cell | | |
|---|---|---|---|
| | Inner part of cell | Cell edge | CRE zone |
| Very Low | No selection of $1^{st}$, $2^{nd}$ or $3^{rd}$ receiver configuration | Follow mapping based on minimum conditions (e.g. table 1) but apply inter-cell interference mitigation to signal from the strongest interfering node. | |
| Medium | No selection of $1^{st}$, $2^{nd}$ or $3^{rd}$ receiver configuration | Follow mapping based on minimum conditions (e.g., table 1). | Select $1^{st}$ receiver configuration. For $2^{nd}$ or $3^{rd}$ receiver configuration follow mapping based on minimum conditions (e.g., table 1). |
| High | No selection of $1^{st}$, $2^{nd}$ or $3^{rd}$ receiver configuration or select $1^{st}$ UE receiver configuration | Follow mapping based on minimum conditions (e.g., table 1). | Select $1^{st}$ receiver configuration. For $2^{nd}$ or $3^{rd}$ receiver configuration follow mapping based on minimum conditions (e.g., table 1). |

TABLE 6

Selection of receiver configuration based on combination of additional
conditions (UE battery life or power consumption, UE location in serving
cell and low Interference time-frequency resource is configured)

| UE battery life or power consumption | UE location in serving cell | | |
|---|---|---|---|
| | Inner part of cell | Cell edge | CRE zone |
| Very Low | No selection of $1^{st}$, $2^{nd}$ or $3^{rd}$ receiver configuration | Select $1^{st}$ receiver configuration in low Interference time-frequency resources. | |
| Medium | No selection of $1^{st}$, $2^{nd}$ or $3^{rd}$ receiver configuration | For remaining time-frequency resources follow table 5. | |
| High | No selection of $1^{st}$, $2^{nd}$ or $3^{rd}$ receiver configuration or select $1^{st}$ UE receiver configuration | | |

Although the above conditions are referred to as additional conditions, in some embodiments one or more of the conditions may replace the physical channel load and/or physical signal relation as a minimum condition.

The method in the UE and/or network node of determining the additional conditions is described below.

UE Location with Respect to the Interfering Node:

The UE or network node may use UE location as one of the conditions for selecting the UE receiver configuration for interference mitigation. The UE location can be the location only with respect to the serving node (e.g, RNN 104) or measured node (e.g., RNN 105), only with respect to the interfering node, or a UE location relative to both serving/measured cell and interfering node.

The UE location enables the UE or the network node to determine the severity of the interfering signals at the UE received from the interfering nodes. For example, if the UE is at the cell border region of the serving cell, then the network node may infer that the UE is more severely affected by the interference from the interfering nodes compared to a situation in which the UE is in an inner region of the serving cell. In this case, the network node may select the UE receiver configuration according to the minimum conditions (e.g. follow table 1). If, on the other hand, the UE is close to serving cell or measured cell but far from the interfering node, then the UE or network node may decide to not select any of the UE receiver configurations for interference mitigation, as shown in Table 2. In this case the UE may have to use a baseline receiver without any need for network assisted interference mitigation. The UE location can be expressed in terms of a serving signal measurement result such as signal strength, geometry factor (e.g., ratio of serving cell received power to interference), serving cell SINR, relative signal measurement between serving/measured and interfering nodes, etc. The network node can acquire radio measurement results (e.g. relative RSRQ or RSRP between serving and interfering nodes) from the UE.

The UE or network node may determine the UE location based on one or more of the following: radio measurements performed by the UE; and UE location or positioning (e.g., based on existing positioning method such as E-CID measurements such as UE Rx-Tx time difference, A-GNSS, OTDOA, etc.). UE measurements and the determination of UE position is discussed below.

A. Radio Measurements

1. UE Measurements

The RSRP and RSRQ are the two existing UE radio measurements used for at least RRM such as for mobility, which include mobility in RRC connected state as well as in RRC idle state. The RSRP and RSRQ are also used for other purposes such as for enhanced cell ID positioning, minimization of drive test (MDT) etc. The cell identification, radio link monitoring (e.g. out of sync and in sync detection) are also type of UE radio measurements.

The measurements can be absolute or relative. An absolute measurement is performed on signals from one cell e.g. serving cell or neighboring cell. A relative measurement is the relative difference between the measurement performed on one cell and on another cell e.g. between serving cell measurement and neighboring cell measurement.

The channel state information (CSI) measurements performed by the UE on serving cell are used for scheduling, link adaptation etc by the network. Examples of CSI measurements are CQI, PMI, RI etc.

2. Radio Network Node Measurements

In order to support different functions such as mobility (e.g. cell selection, handover etc), positioning a UE, link adaption, scheduling, load balancing, admission control, interference management, interference mitigation etc, the radio network node also performs radio measurements on signals transmitted and/or received by the radio network node. Examples of such measurements are SNR, SINR, received interference power (RIP), BLER, propagation delay between UE and itself, transmit carrier power, transmit power of specific signals (e.g. Tx power of reference signals), positioning measurements etc.

B. Location Services in Cellular (3GPP) Networks

The position of the target device is determined by using one or more positioning measurements, which can be performed by a suitable measuring node or the target device.

In LTE, the positioning node (aka E-SMLC or location server) configures the target device (e.g. UE), eNode B or a radio node dedicated for positioning measurements (e.g. LMU) to perform one or more positioning measurements depending upon the positioning method. The positioning measurements are used by the target device or by a measuring node or by the positioning node to determine the location of the target device. In LTE the positioning node communicates with UE using LTE positioning protocol (LPP) and with eNode B using LTE positioning protocol annex (LPPa).

The well-known positioning methods used in cellular systems (e.g. LTE) are described below:

Satellite based methods: In this case the positioning measurements are performed by the target device on signals received from the navigational satellites are used for determining the target device's location. For example either GNSS or A-GNSS (e.g. A-GPS, Galileo, COMPASS, GANSS etc) measurements are used for determining the UE position.

OTDOA: This method uses UE measurements related to time difference of arrival of signals from radio nodes (e.g. reference signal received time difference (RSTD) measurement in LTE) for determining UE position in LTE or SFN-SFN type 2 in HSPA. To speed up OTDOA measurements and also to improve their accuracy, the positioning server provides OTDOA assistance information to the target device. The OTDOA can also be UE based or UE assisted positioning method. In the former the target device determines its location itself whereas in the latter the positioning server (e.g. E-SMLC) uses the received OTDOA measurements from the target device to determine the location of the target device.

UTDOA: It uses measurements done at a measuring node (e.g. location measurement unit (LMU)) on signals transmitted by the target device. The LMU measurements from multiple LMUs are used by the location server (e.g. E-SMLC in LTE) for determining the position of the target device.

Enhanced cell ID (E-CID): It uses one or more radio measurements for determining the target device's position. The E-CID method uses at least the cell ID of a serving and/or a neighboring cell and at least one additional radio measurements which can be performed by the target device or by a radio node. For example E-CID method typically uses any combination of cell ID and radio measurements such as UE Rx-Tx time difference, BS Rx-Tx time difference, timing advanced (TA) measured by the BS, LTE RSRP and/or RSRQ, HSPA CPICH measurements (CPICH RSCP and/or CPICH Ec/No), angle of arrival (AoA) measured by the BS on UE transmitted signals etc for determining the position of the target device. The TA measurement is done using either UE Rx-Tx time difference or BS Rx-Tx time difference or both.

Hybrid methods: It relies on positioning measurements related to more than one positioning methods for determining the position of the target device. For example the hybrid method may use A-GNSS measurements and OTDOA RSTD measurements for determining the position of the target device.

UE Battery Life or Power Consumption:

Inter-cell interference mitigation requires power consumption, memory and processing at the UE. Therefore, to avoid UE battery drainage, the UE or network node may selectively decide whether to activate the interference mitigation and also selects the appropriate UE receiver configuration for doing so. For example, if the UE battery life is below a threshold, then the network node or UE may not select any of the UE interference mitigation receiver configuration at the UE, as shown in table 3. If the UE battery life is not below a threshold, the network node or UE selects the UE receiver configuration for interference mitigation at the UE according to pre-defined rules based on minimum conditions (e.g., according to mapping in the lookup table 1).

The network can determine the UE battery life by, for example, explicitly receiving the current UE battery level (e.g. absolute value in terms of watts, discrete power levels (e.g., charge levels) such as low, medium and high, etc.) from the UE. The network can also implicitly determine the state of the UE battery life, for example by observing the UE activity level over the past time period ($T_0$). For instance, if the UE is receiving data over the last certain number of frames (e.g. 100-200) then the network may implicitly assume that the UE battery life is low; otherwise, it may assume the battery life if medium or high.

Low Interference Time-Frequency Resource Configuration:

In an embodiment, if the UE is receiving signals from a cell (e.g., serving or neighbor cells) using time-frequency resources (e.g. subframe) with no or low interference, then only the $1^{st}$ receiver configuration is selected and none of the $2^{nd}$ or $3^{rd}$ receiver configuration is selected. In a heterogeneous network, the UE may be configured with one or more receivers to perform measurements and receive data in victim cells (e.g. cell served by a low power node) in low interference time-frequency resources. An example of such low interference resource includes patterns of restricted subframes (e.g., resource restricted measurement patterns for serving (or PCell) and for neighbor cells). The aggressor cell is configured with a transmit pattern (e.g., almost blank subframe (ABS)). Therefore in this case the interference from physical channels (e.g., PDSCH, PDCCH, etc) in aggressor cells is very low or non-existence at the victim UE. The UE or network nodes may be aware of the restricted subframe pattern configured at the UE. Therefore the UE or network node can use this criterion (e.g., whether UE uses such pattern or not) to select the appropriate receiver configuration. The UE may for example use or can be configured by the network node to use the $1^{st}$ receiver configuration in low interference time-frequency resources. In normal subframes (e.g. non restricted subframes) the receiver configuration can be selected based on other conditions as mentioned above. The selection based on low frequency time-resource configuration is shown in table 6.

WCD (e.g., UE) Selecting WCD Receiver Configuration:

In one embodiment, the WCD (e.g., UE) selects one of the WCD (e.g., UE) receiver configurations for receiving a desired signal and mitigating the interfering signals according to one or more conditions as described above. It may be pre-defined that the UE is allowed to select the receiver configuration according to one or more pre-defined conditions. The UE may also perform the selection of the receiver configuration autonomously or only when explicitly permitted by the network node.

WCD (e.g., UE) Signaling Information Related to Selected Receiver Configuration to Network Node:

In one embodiment, the WCD (e.g., UE) upon selecting one of the WCD receiver configurations or statistics of the selected WCD receiver configurations over certain time period (e.g. during a session, over last M number of radio frames or TTI), may signal the information related to the said selecting the WCD receiver configurations to the network node. The UE may also inform the network of the conditions used for selecting the UE receiver configurations at different times.

If the UE is not using or has not selected any of interference mitigation receiver configuration, then the UE can also indicate this to the network node. The UE may also explicitly indicate that it is using a baseline receiver and so it does not need any assistance information for assisting interference mitigation.

Network Node Selecting WCD (e.g., UE) Receiver Configuration

In one embodiment the network node (e.g. UE-serving network node) selects one of the UE receiver configurations for enabling the UE to receive the desired signal and mitigate the interfering signals according to one or more conditions as described above. It may also be pre-defined that the UE is not allowed to autonomously select the receiver configuration. Instead it may be pre-defined that the network node will select the UE receiver configuration according to one or more pre-defined conditions and configure the UE with the selected configuration. It may also be pre-defined that the network node will configure the UE with one or more conditions or associated values (e.g., thresholds for conditions) and then the UE will use the configured information to autonomously select the UE receiver configuration out of the pre-defined configurations.

In one embodiment, it may also be pre-defined that the UE may select and recommend UE receiver configurations based on one or more pre-defined rules and/or conditions and inform the recommendation results to the network node. The network will also determine the UE receiver configuration and also take into account the UE recommended receiver configuration for final selection of the UE receiver configuration.

In one embodiment, the network, upon selecting the UE receiver configuration based on one or more of the principles or rules described above, configures the UE with the UE receiver configuration and/or associated parameters (e.g., threshold values such as load or signal quality levels corresponding to low, medium and high, etc.).

UE Signaling Capability Associated with UE Receiver Configuration to Network Node According to this embodiment, the UE which supports such signaling capability may inform the network node that for mitigating interference from one or more interfering node it is capable of selecting and adapting its receiver configuration according to one of the first UE receiver configuration, second UE receiver configuration and third UE receiver configuration mentioned above, and to perform the selection based on one or more conditions, such as those described above.

The capability may also include one or more of the following additional information and parameters, such as a UE that is capable of adapting its receiver configuration:

i) autonomously, based on pre-defined rules or based on instructions or configuration received from the network node;

ii) for all or subset of certain type and/or number of physical channels and physical signals used in a serving/measured cell;

iii) provided only certain types and/or number of physical channels and physical signals are used in interfering nodes;

iv) for all or selected frequency bands;

v) for up to a certain (e.g., predefined) number of interfering nodes;

vi) only in a specific deployment scenario (e.g., CoMP, Heterogeneous network, etc.);

vii) which is associated with specific frequency ranges (e.g. frequencies below 2 GHz) or frequency bands (e.g. specific pre-defined band numbers);

viii) for one or more than one carrier frequency (e.g. primary component carrier and at least one secondary component carrier) in carrier aggregation;

ix) on more than one radio link in multiflow or CoMP scenario on a carrier;

x) on more than one carrier frequency (e.g. primary component carrier and at least one secondary component carrier) in a combined carrier aggregation and multiflow or CoMP scenario;

xi) only when it receives from the network node the assistance information related to physical channel and physical signal configuration used in the interfering nodes;

xii) without requiring any assistance information (e.g., without scheduling information of DL transmissions in interfering nodes).

The UE may send the capability information to the network node in any of the following manner: i) proactive reporting without receiving any explicit request from the network node (e.g. reporting to a serving or any target network node); and ii) reporting upon receiving any explicit request from the network node (e.g. serving or any target network node). The explicit request can be sent to the UE by the network node at any time or at any specific occasion. For example, the request for the capability reporting can be sent to the UE during initial setup or after a cell change (e.g. handover, RRC connection re-establishment, RRC connection release with redirection, PCell change in CA, PCC change in PCC, etc.).

In case of proactive reporting, the UE may report its capability during one or more of the following occasions: i) during initial setup or call setup (e.g., when establishing the RRC connection); and ii) during cell change (e.g., handover, primary carrier change in multi-carrier operation, PCell change in multi-carrier operation, RRC re-establishment, RRC connection release with redirection, etc.).

The acquired capability information may be used by the serving network node for taking one or more radio operation tasks or actions.

The network node (e.g. eNode B, serving RNC, BS, Node B, BS, etc.) uses at least the received UE capability information in order to determine whether to select the UE receiver configuration enabling the UE for mitigating interference from an interfering node. The network node may also decide which parameter values (e.g. thresholds, conditions, etc.) to be configured at the UE. The network node uses suitable conditions for making this decision in order to configure the UE to use a certain type of receiver as elaborated above.

In an embodiment, the network node may also forward the received UE capability information to another network node (e.g., to a neighboring radio network node, such as a SON, O&M, OSS, etc.). This forwarding will avoid the need for the UE to again report its capability to a new serving radio node after the cell changes (e.g., after handover). In this way signaling overheads can be reduced and the target radio node can quickly select the appropriate receiver type. The network node may also store the capability information of a plurality of UEs and use the data for network planning and tuning of network parameters.

Network Node Configuring UE with Assistance Information for Interference Mitigation In an embodiment, the UE, after selecting the appropriate UE receiver configuration autonomously, based on a predefined rule, based on configuration from the network node, or any combination thereof as described in preceding sections, performs the interference mitigation. The interference mitigation step may require assistance information from the network depending upon the selected receiver configuration.

Therefore the network node upon receiving an indication from the UE about the selected receiver configuration or upon selection of the said receiver configuration for the UE may create assistance information. The assistance information is sent by the network node to the UE. The network node may also configure another network node (e.g., interfering nodes) with appropriate parameters depending upon the selected receiver configuration, examples of which are provided below.

EXAMPLES (1) In order to assist the UE to mitigate interference by using the selected first UE receiver configuration (i.e. mitigate interference caused by physical signals from interfering nodes), the network node does not need to provide any information related to the physical resources used for downlink transmissions in an interfering node. However the network node may still send at least the cell IDs of the interfering nodes. Further, the network node may at least send an indication on a number of interferers (e.g. strongest neighbor cells) whose interference is to be mitigated by the victim UE. The network node may also send information about physical signal configuration such as antenna configuration (e.g. number of CRS antenna ports), MBSFN configuration (e.g. subframes used for MBSFN in a frame), etc. The UE may use this information to identify the strongest interferer and apply interference mitigation.

(2) In order to assist the UE to mitigate interference by using the selected second UE receiver configuration (i.e. mitigate interference caused by physical channels from interfering nodes) the network node provides one or a plurality of information related to the physical resources (e.g. PDSCH) used for downlink transmissions in one or a plurality of interfering nodes. In one example, the network node provides the UE with the dynamic information which comprises scheduling of resources in one or more interfering nodes in every transmission time interval (TTI) or certain number of TTIs. In another example, the network node provides the UE with the semi-static information which comprises set of resources which can be scheduled in one or more interfering nodes. These two cases are further illustrated below:

The dynamic assistance information depends upon the type of physical channel or physical signal (e.g. HS-SCCH, HS-DSCH, A-GCH, E-ROCH, BCH, PDSCH in LTE, PDCCH in LTE, etc) whose interference needs to be mitigated from the interfering nodes. The information can be provided for one or a plurality of interfering nodes for every TTI or for certain consecutive TTIs to the UE. Typically the assistance information may include cell IDs of interfering nodes, UE ID (e.g. C-RNTI), antenna configuration or antenna transmission mode used by the UE, physical channel resources used for each UE whose downlink transmissions in the interfering node cause interference to victim UEs in a victim cell. The physical resources may comprise one or more of the physical resource block (PRB) allocation in LTE, CDMA or OVSF channelization code in CDMA, number of channelization codes, transport format, or modulation coding scheme (MCS), etc. In order to send this information to the UE the network node acquires this information from the interfering nodes.

In the semi-static case the UE is configured with a potential set of physical channel resources (e.g. a set of transport format/MCS, channelization codes, resource blocks, etc.) which can be used for downlink transmissions in the interfering node. The UE therefore needs to blindly decode the actual physical channel used in the interfering nodes out of the configured set. The configured set is therefore typically a reduced set of all possible channel configurations. This requires that the resource assignment in the interfering nodes to its own UEs is limited to the set of physical resources configured at the victim UE. This puts constraints on the network in terms of scheduling and resource assignment in interfering nodes. Therefore the network node coordinates with the interfering nodes to obtain the information about the semi-static configuration that can be used or currently used in the said interfering nodes.

(3) In order to assist the UE to mitigate interference by using the selected third UE receiver configuration (i.e. mitigate interference caused by physical signals and physical channels from interfering nodes) the network node may provide the assistance information corresponding to the first and second UE receiver configurations as described above.

(4) In case none of the three UE receiver configuration is used by the UE then the network node does not need to provide any assistance information.

WCD (e.g., UE) Adapting Receiver Configuration

The WCD (e.g., UE), after selecting the receiver configuration (e.g., autonomously, based on pre-defined rule, based on configuration performed by the network node or based on any combination thereof) as described herein and after receiving the assistance information (if needed) as described above, applies the selected receiver configuration for mitigating the interference caused by one or more interfering nodes. The UE can assess the need for adapting to a new receiver configuration after certain time period (e.g. after M number of TTIs or J number of radio frames, such as every 10 frames or 100 ms). The UE may receive updated or latest assistance information from the network node even if the UE receiver configuration is the same (e.g., since dynamic resource assignment is changed every TTI).

If the receiver configuration is changed by itself or by the network node, then the assistance information sent to the UE may also be updated. For example, the UE may obtain additional assistance information if, for example, the first receiver configuration is changed to the third receiver configuration, and may obtain reduced assistance information if the third receiver configuration is changed to second receiver configuration.

Network Node Signaling Information Related to Receiver Configuration Selection to Another Network Node The network node may maintain and store information or statistics related to the UE receiver configuration (e.g., that the UE is configured to the first, second, or third receiver configurations, or is configured to perform no network assisted interference mitigation) selected and used by the UE for mitigating interference from one or more interfering nodes as described above. The statistics or the stored data can be forwarded (e.g., signaled) to other network nodes. Examples of other network nodes are neighboring base stations (e.g. eNB sending to other, neighboring eNBs over an X2 interface), a positioning node (E-SMLC in LTE), a third node, a MDT node, a SON node, an O&M node, an OSS node, a network monitoring node, a network planning node, etc.

The network node forwarding the information or the other network nodes receiving the information may use this information for one or more network management tasks. Examples of such tasks are configuration of radio network parameters (e.g. maximum output power of base station, deployment of new radio nodes, location of low power nodes within coverage of high power nodes, etc.) to enhance the network performance. For example, if certain receiver configuration is more commonly used then the network node may configure the network parameters which may enhance the performance of that receiver configuration.

Example Process

Figure 2:
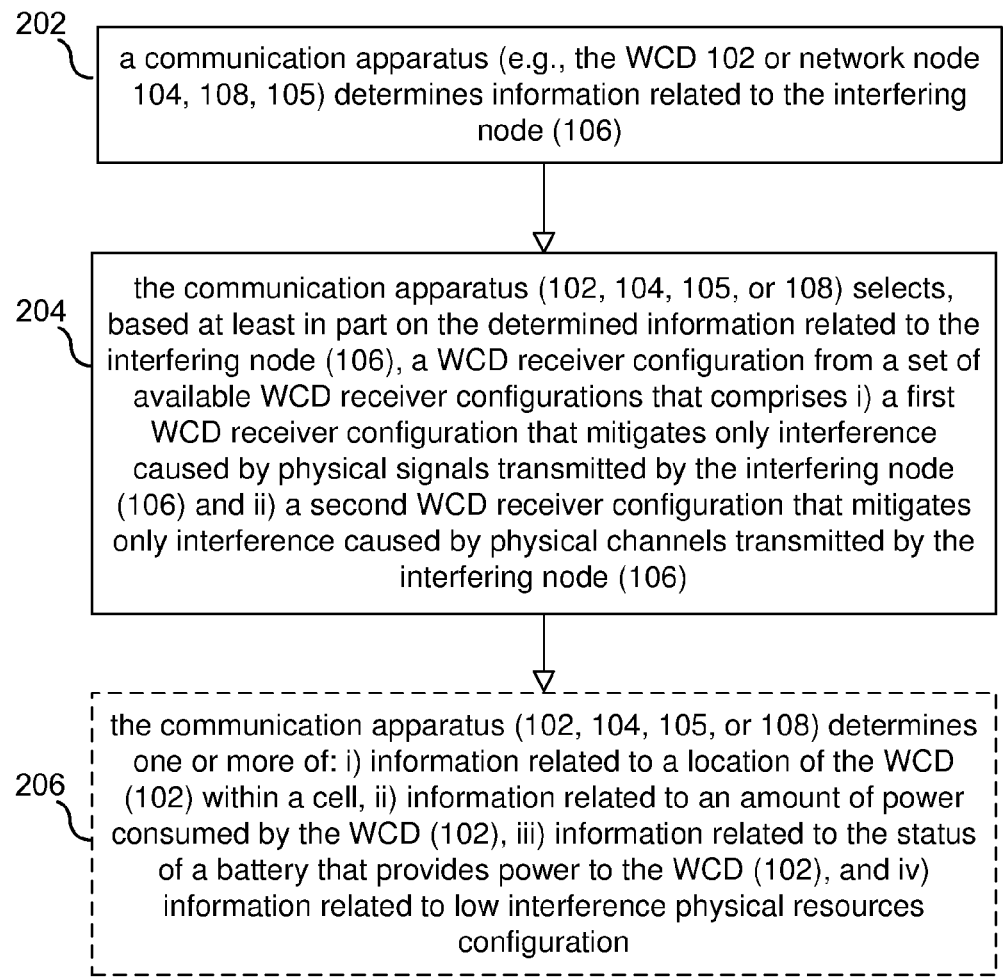
FIGS. 2-4 illustrate a flow diagram that shows a method according to various aspects of the present disclosure.

Referring now to FIG. 2, FIG. 2 is a flow chart illustrating a process, according to one embodiment, for mitigating interference experienced by wireless communication device (e.g., a UE 102) from a signal transmitted (e.g., broadcasted) by an interfering node (e.g., interfering node 106).

The process may begin in step 202, in which a communication apparatus (e.g., the UE 102 or network node 104, 108, or 105) determines information related to the interfering node 106.

Figure 3:
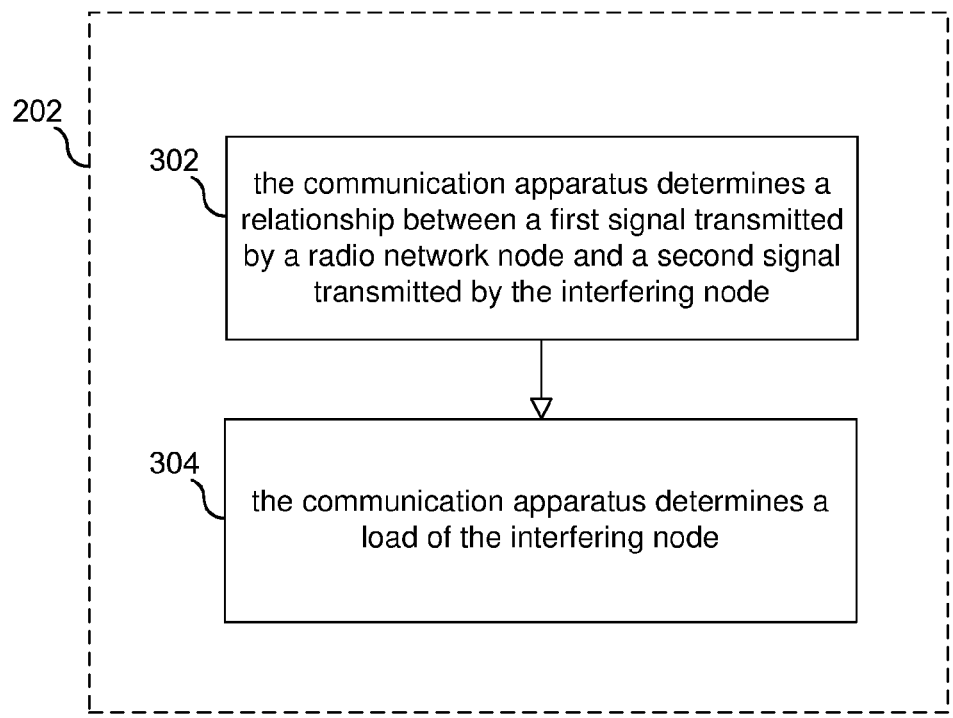

In one embodiment, as illustrated in FIG. 3, determining information related to the interfering node includes one or more of i) step 302 and ii) step 304. In step 302, the communication apparatus determines a relationship between a first signal transmitted by a radio network node (e.g., RNN 104 or RNN 105) and a second signal transmitted by the interfering node. In step 304, the communication apparatus determines a load of the interfering node 106.

Returning to FIG. 2, at step 204 the communication apparatus (102, 104, 105, or 108) selects, based at least in part on the determined information related to the interfering node (106), a WCD receiver configuration from a set of available WCD receiver configurations that comprises i) a first WCD receiver configuration that mitigates only interference caused by physical signals transmitted by the interfering node (106) and ii) a second WCD receiver configuration that mitigates only interference caused by physical channels transmitted by the interfering node (106).

In an embodiment, the set of WCD receiver configurations further comprises a third WCD receiver configuration that mitigates interference caused by both physical signals and physical channels transmitted by the interfering node (106).

In one embodiment, the communication apparatus performs step 206, in which it determines information related to the WCD. The information includes, for example, information related to a location of the WCD within a cell, information related to an amount of power consumed by the WCD, information related to the status of a battery that provides power to the WCD, and/or information related to low interference physical resource configuration. The selection of the WCD receiver configuration may be based at least in part on the determined information related to the WCD.

In one embodiment where the WCD selects the WCD receiver configuration, the WCD may mitigate the interference by using the selected receiver configuration without requiring any information from any network node. In a second embodiment where the WCD selects the WCD receiver configuration, the UE may mitigate the interference using the selected receiver configuration and assistance information received from a network node.

If the network node selects the WCD receiver configuration, then the network node transmits to the WCD information identifying the selected WCD receiver configuration. In response to receiving the message, the WCD uses the identified WCD receiver configuration.

Figure 4:
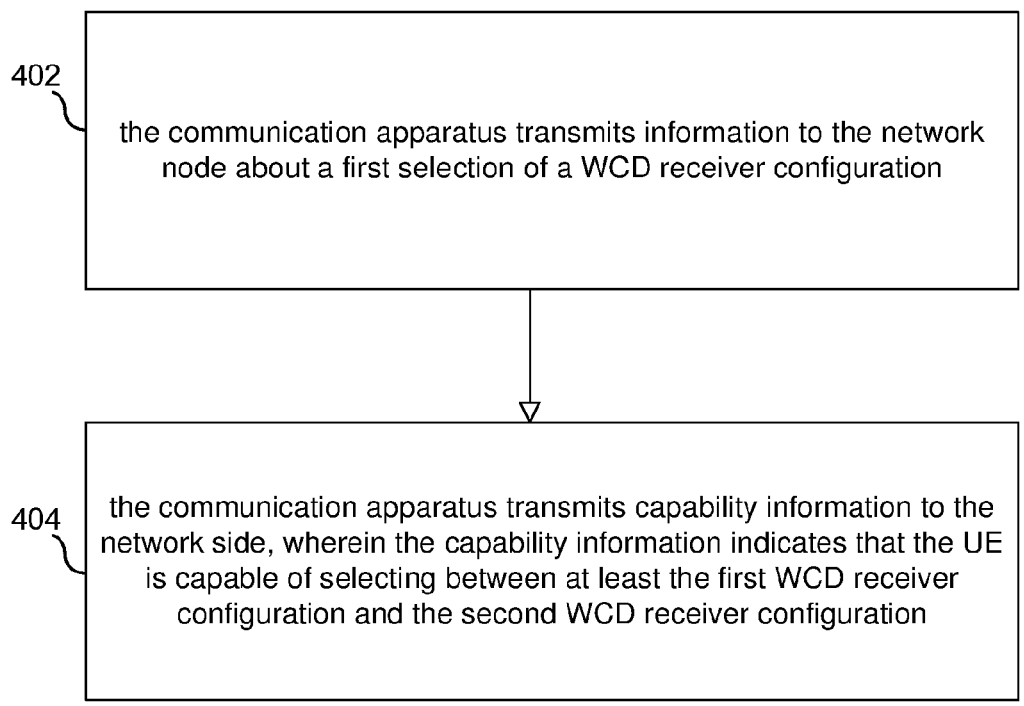

In one embodiment, as illustrated in FIG. 4, the WCD may transmit information to the network node, which may use the information in selecting the WCD receiver configuration. For example, in step 402, the WCD may transmit to the network node information about a first selection of the WCD receiver configuration. The first selection may be, for instance, a recommendation for approval, denial, or alteration by the network node. In some cases, if the network node chooses to not adopt the recommendation, it may send back a second WCD receiver configuration to the WCD. In step 404, the communication apparatus transmits capability information to the network side. The capability information indicates that the WCD is capable of selecting between at least the first WCD receiver configuration and the second WCD receiver configuration. This information may also facilitate a network node's selection of a WCD receiver configuration.

In one embodiment, prior to the apparatus performing step 204, the apparatus determines whether a set of one or more conditions is true and performs step 204 only if the determined set of conditions is true. In one embodiment, determining whether the set of one or more conditions is true comprises: determining whether the WCD's battery life is greater than a threshold and/or determining whether a WCD location condition is true.

In one embodiment, determining whether a UE location condition is true comprises determining whether or not the UE is located within an inner part of a serving cell.

First Example of Communication Apparatus for Mitigating Interference

Figure 5:
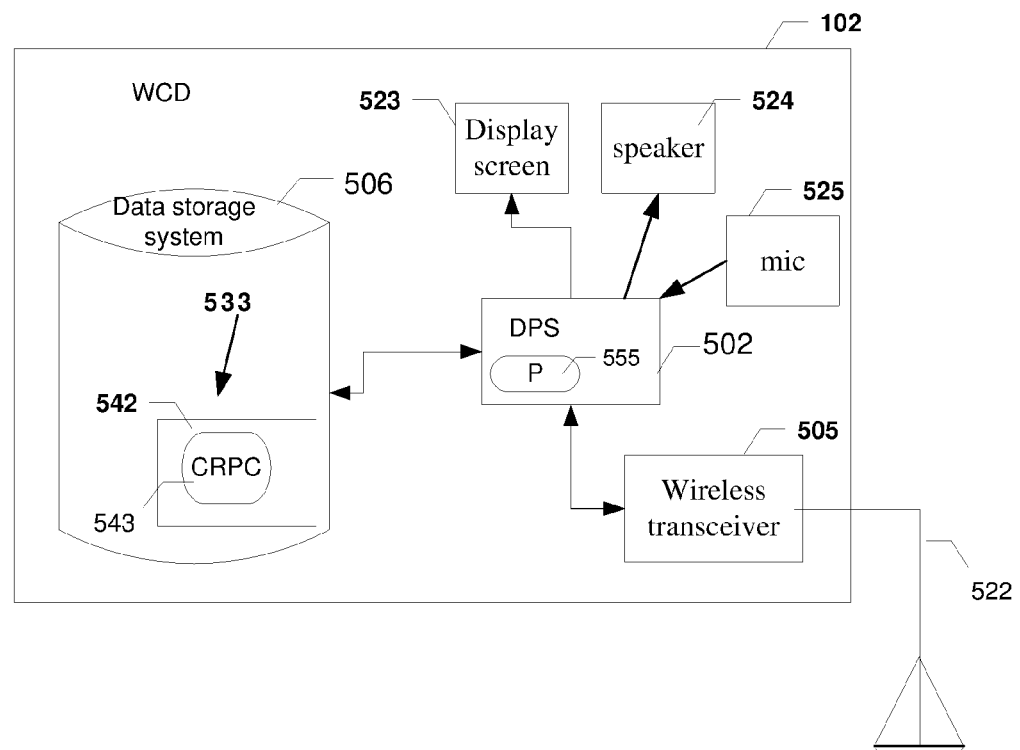
FIG. 5 illustrates a wireless communication device, according to various aspects of the present disclosure.

FIG. 5 illustrates a block diagram of an example communication apparatus 102 for mitigating interference experienced by a wireless communication device. In the example, the communication apparatus 102 is a WCD. As shown in FIG. 5, communication apparatus 102 includes: a data processing system (DPS) 502, which may include one or more processors (P) 555 (e.g., microprocessors) and/or one or more circuits, such as an application specific integrated circuit (ASIC), Field-programmable gate arrays (FPGAs), etc.; a wireless transceiver 505, connected to an antenna 522, for receiving information from, and transmitting information to, network nodes (e.g., RNNs 104, 105, 106); a data storage system 506, which may include one or more computer-readable data storage mediums, such as non-transitory memory unit (e.g., hard drive, flash memory, optical disk, etc.) and/or volatile storage apparatuses (e.g., dynamic random access memory (DRAM)).

In embodiments where data processing system 502 includes a processor 555 (e.g., a microprocessor), a computer program product 533 may be provided, which computer program product includes: computer readable program code 543 (e.g., instructions), which implements a computer program, stored on a computer readable medium 542 of data storage system 506, such as, but not limited, to magnetic media (e.g., a hard disk), optical media (e.g., a DVD), memory devices (e.g., random access memory), etc. In some embodiments, computer readable program code 543 is configured such that, when executed by data processing system 502, code 543 causes the data processing system 502 to perform steps described herein (e.g., step shown in FIG. 2).

In some embodiments, communication apparatus 102 is configured to perform steps described above without the need for code 543. For example, data processing system 502 may consist merely of specialized hardware, such as one or more application-specific integrated circuits (ASICs). Hence, the features of the present disclosure described above may be implemented in hardware and/or software. For example, in some embodiments, the functional components of communication apparatus 102 described above may be implemented by data processing system 502 executing program code 543, by data processing system 502 operating independent of any computer program code 543, or by any suitable combination of hardware and/or software.

In another embodiment, communication apparatus 102 further includes: 1) a display screen 523 coupled to the data processing system 502 that enables the data processing system 502 to display information to a user of communication apparatus 102; 2) a speaker 524 coupled to the data processing system 502 that enables the data processing system 502 to output audio to the user of communication apparatus 102; and 3) a microphone 525 coupled to the data processing system 502 that enables the data processing system 502 to receive audio from the user.

Second Example of Apparatus for Mitigating Interference

Figure 6:
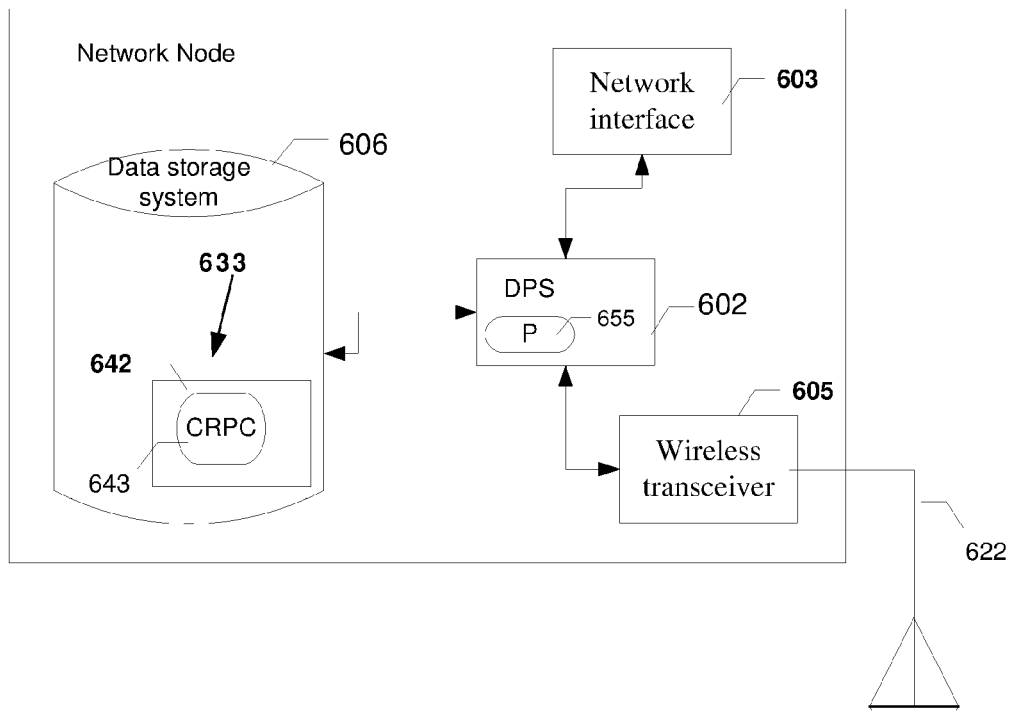
FIG. 6 illustrates a communication apparatus, according to various aspects of the present disclosure.

FIG. 6 illustrates a block diagram of an example communication apparatus for mitigating interference experienced by a wireless communication device. In the example, the apparatus is a network node, which could be a radio network node or a core network node. As shown in FIG. 6, the network node includes: a data processing system (DPS) 602, which may include one or more processors (P) 655 (e.g., microprocessors) and/or one or more circuits, such as an application specific integrated circuit (ASIC), Field-programmable gate arrays (FPGAs), etc.; a network interface 603 for connecting the network node to core network 110; a data storage system 606, which may include one or more computer-readable data storage mediums, such as non-transitory memory unit (e.g., hard drive, flash memory, optical disk, etc.) and/or volatile storage apparatuses (e.g., dynamic random access memory (DRAM)). In the case that network node is a radio network node, then, as shown in FIG. 6, the network node further includes a wireless transceiver 605, connected to an antenna 622, for receiving information from, and transmitting information to, UEs.

In embodiments where data processing system 602 includes a processor 655 (e.g., a microprocessor), a computer program product 633 may be provided, which computer program product includes: computer readable program code 643 (e.g., instructions), which implements a computer program, stored on a computer readable medium 642 of data storage system 606, such as, but not limited, to magnetic media (e.g., a hard disk), optical media (e.g., a DVD), memory devices (e.g., random access memory), etc. In some embodiments, computer readable program code 643 is configured such that, when executed by data processing system 602, code 643 causes the data processing system 602 to perform steps described herein.

In some embodiments, network node is configured to perform steps described above without the need for code 643. For example, data processing system 602 may consist merely of specialized hardware, such as one or more application-specific integrated circuits (ASICs). Hence, the features of the present disclosure described above may be implemented in hardware and/or software. For example, in some embodiments, the functional components of network node described above may be implemented by data processing system 602 executing program code 643, by data processing system 602 operating independent of any computer program code 643, or by any suitable combination of hardware and/or software.

The UE is able to use the most appropriate combination of receivers to mitigate the interference caused by aggressor or interfering nodes.

The UE only uses more complex receivers when they are needed. This in turn reduces the UE complexity, enhanced UE battery life and reduces processing at the UE.

Figure 7:
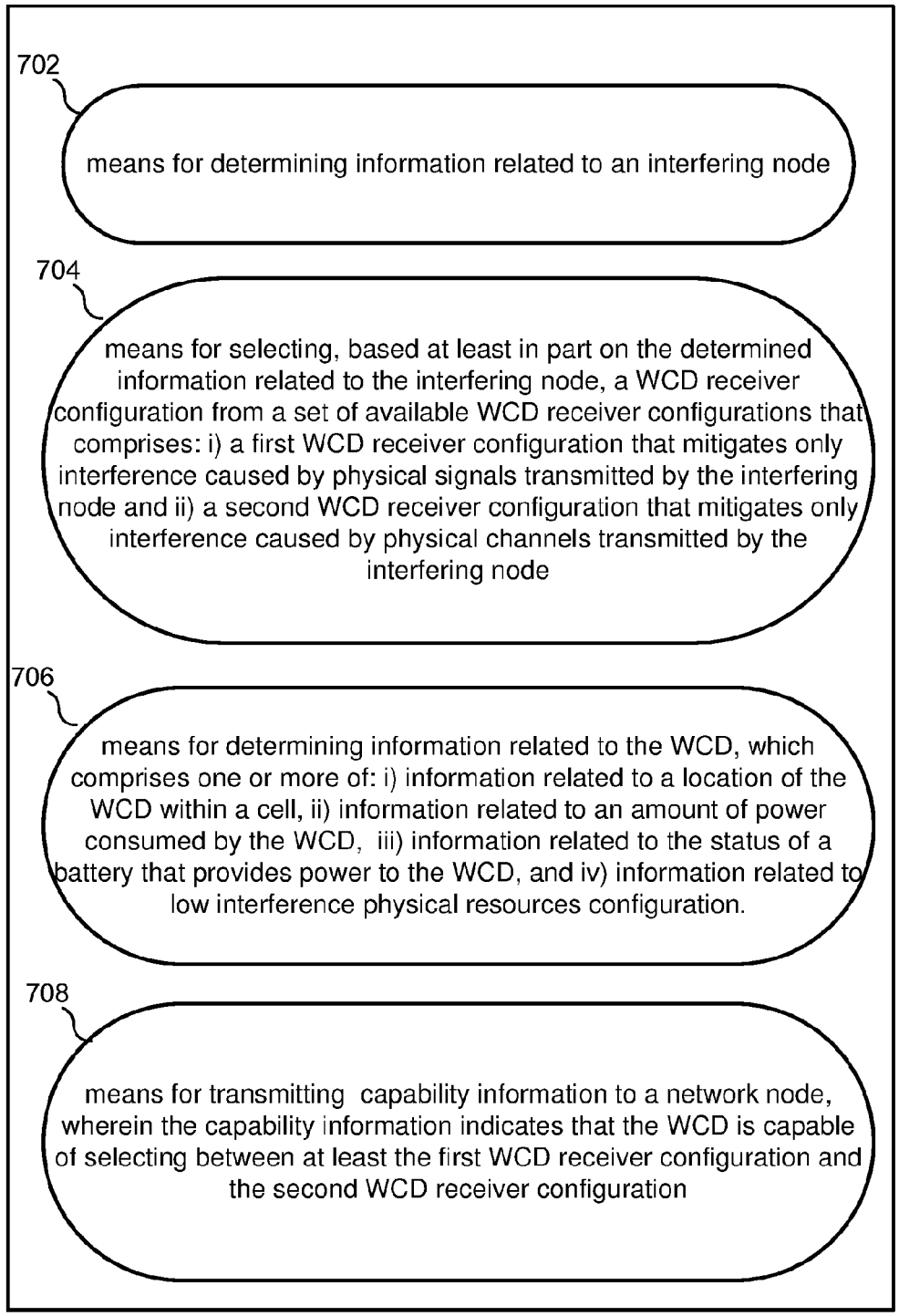
FIG. 7 illustrates a apparatus, according to various aspects of the present disclosure.

FIG. 7 illustrates various components of an apparatus (e.g., a communication apparatus) for mitigating interference experienced by a wireless communication device, WCD. The components include: a) means for (702) determining information related to an interfering node; b) means for (704) selecting, based at least in part on the determined information related to the interfering node, a WCD receiver configuration from a set of available WCD receiver configurations that comprises: i) a first WCD receiver configuration that mitigates only interference caused by physical signals transmitted by the interfering node and ii) a second WCD receiver configuration that mitigates only interference caused by physical channels transmitted by the interfering node; c) means for (706) determining information related to the WCD, which comprises one or more of: i) information related to a location of the WCD within a cell, ii) information related to an amount of power consumed by the WCD, iii) information related to the status of a battery that provides power to the WCD, and iv) information related to low interference physical resources configuration; d) means for (708) transmitting capability information to a network node, wherein the capability information indicates that the WCD is capable of selecting between at least the first WCD receiver configuration and the second WCD receiver configuration.

While various aspects and embodiments of the present disclosure have been described above, it should be understood that they have been presented by way of example only, and not limitation. Thus, the breadth and scope of the present disclosure should not be limited by any of the above-described exemplary embodiments. Moreover, any combination of the elements described in this disclosure in all possible variations thereof is encompassed by the disclosure unless otherwise indicated herein or otherwise clearly contradicted by context.

Additionally, while the processes described herein and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

ABBREVIATIONS

BS Base Station
CID Cell Identity
CRS Cell-specific Reference Signal
DAS Distributed Antenna System
DL Downlink
DMRS Demodulation Reference Signal
eICIC Enhanced Inter-Cell Interference Coordination
ICIC Inter-Cell Interference Coordination
ID Identity
L1 Layer 1
L2 Layer 2
LTE Long Term Evolution
MAC Medium Access Control
OFDM Orthogonal Frequency Division Multiplexing
PBCH Physical Broadcast Channel
PCFICH Physical Control format Indicator
PDCCH Physical Downlink Control Channel
PDSCH Physical Downlink Shared Channel
PHICH Physical Hybrid ARQ Indicator Channel
PSS Primary Synchronization Signal
RAT Radio Access Technology
RE Resource Element
RB Resource Block
RRH Remote radio head
RRM Radio Resource Management
RRU Remote radio unit
RSRQ Reference signal received quality
RSRP Reference signal received power
SFN Single Frequency Network
SRS Sounding Reference Signal
SSS Secondary Synchronization Signal
UE User Equipment
UL Uplink
RSTD Reference signal time difference
SON Self Organizing Network
RSSI Received signal strength indicator
O&M Operational and Maintenance
OSS Operational Support Systems
OTDOA Observed time difference of arrival
OVSF Orthogonal Variable Spreading Factor

The invention claimed is:

1. A method performed by a user equipment (UE) for mitigating interference experienced by the UE, and caused by signals transmitted by an interfering node, the method comprising:
   determining information related to the interfering node; and
   selecting, based at least in part on the determined information related to the interfering node, a UE receiver configuration from a set of available UE receiver configurations that comprises
   i. a first UE receiver configuration that mitigates only interference caused by physical signals transmitted by the interfering node; and
   ii. a second UE receiver configuration that mitigates only interference caused by physical channels transmitted by the interfering node; and
   iii. a third UE receiver configuration that mitigates interference caused by both physical signals and physical channels transmitted by the interfering node.

2. The method of claim 1, wherein the physical signal is a cell-specific reference signal (CRS).

3. The method of claim 1, wherein the physical channel is a Physical Downlink Shared Channel (PDSCH).

4. The method of claim 1, wherein determining information related to the interfering node includes one or more of:
   i. determining a relationship between a first signal transmitted by a radio network node and a second signal transmitted by the interfering node; and
   ii. determining a load of the interfering node.

5. The method of claim 4, wherein determining the load of the interfering node comprises determining the transmit power of the interfering node.

6. The method of claim 5, further comprising transmitting to a network node information about a first selection of the UE receiver configuration for approval or alteration by a network node.

7. The method of claim 1, further comprising determining information related to the UE, which comprises one or more of:
   i. information related to a location of the UE within a cell;
   ii. information related to an amount of power consumed by the UE;
   iii. information related to the status of a battery that provides power to the UE; and
   iv. information related to low interference physical resources configuration, wherein said selecting of the UE receiver configuration is based at least in part on the determined information related to the UE.

8. The method of claim 1, wherein
   the method further comprises a network node providing to the UE assistance information to facilitate the mitigating of the interference by the UE.

9. The method of claim 8, wherein the selecting of the UE configuration is based on one or more of the following:
   i. information about a first selection of the UE receiver configuration; and
   ii. capability information, wherein the capability information indicates that the UE is capable of selecting between at least the first UE receiver configuration and the second UE receiver configuration.

10. The method of claim 8, further comprising transmitting the selected UE receiver configuration or statistics of the selected UE receiver configuration to another network node.

11. The method of claim 1, wherein the interfering node is configured to process information in at least a first logical layer that is a physical layer and a second logical layer that is a higher logical layer than the physical layer,
   wherein the physical signal includes a signal carrying information that originates from the physical layer, and
   wherein the physical channel includes a signal carrying information that originates from the higher logical layer.

12. A user equipment (UE), for mitigating interference experienced by the UE, and caused by signals transmitted by an interfering node, the UE comprising a data storage system and a data processing system, the data storage system comprising instructions executable by the data processing system to:
   determine information related to the interfering node; and
   select, based at least in part on the determined information related to the interfering node, a UE receiver configuration from a set of available UE receiver configurations that comprises i) a first UE receiver configuration that mitigates only interference caused by physical signals transmitted by the interfering node, ii) a second UE receiver configuration that mitigates only interference caused by physical channels transmitted by the interfering node and iii) a third UE receiver configuration that mitigates interference caused by both physical signals and physical channels transmitted by the interfering node.

13. The UE of claim 12, wherein determining information related to the interfering node includes one or more of:
   i. determining a relationship between a first signal transmitted by a radio network node and a second signal transmitted by the interfering node; and
   ii. determining a load of the interfering node.

14. The UE of claim 13, wherein determining the load of the interfering node comprises determining the transmit power of the interfering node.

15. The UE of claim 12, wherein the UE is further operative to determine information related to the UE, which comprises one or more of:
   i. information related to a location of the UE within a cell;
   ii. information related to an amount of power consumed by the UE; and
   iii. information related to the status of a battery that provides power to the UE, wherein the data processing system is configured to select the UE receiver configuration based at least in part on the determined information related to the UE.

16. The UE of claim 12, wherein the UE is further configured to transmit to a network node information about a first selection of the UE receiver configuration for approval or alteration by a network node.

17. The UE of claim 12, wherein
   a network node is configured to provide to the UE assistance information to facilitate mitigating of the interference by the UE.

18. The communication apparatus of claim 17, wherein the apparatus is further configured to transmit the selected UE receiver configuration or statistics of the selected UE receiver configuration to another network node.

19. The UE of claim 12, wherein the interfering node is configured to process information in at least a first logical layer that is a physical layer and a second logical layer that is a higher logical layer than the physical layer,
   wherein the physical signal includes a signal carrying information that originates from the physical layer, and
   wherein the physical channel includes a signal carrying information that originates from the higher logical layer.

* * * * *

UNITED STATES PATENT AND TRADEMARK OFFICE
CERTIFICATE OF CORRECTION

PATENT NO. : 9,985,669 B2  
APPLICATION NO. : 15/240618  
DATED : May 29, 2018  
INVENTOR(S) : Kazmi et al.

Page 1 of 2

It is certified that error appears in the above-identified patent and that said Letters Patent is hereby corrected as shown below:

On the Title Page

In Column 1, under "Notice", Line 3, delete "0 days. days." and insert -- 0 days. --, therefor.

In the Specification

In Column 1, Line 8, delete "Network"" and insert -- Network", now Pat. No. 9,425,839 --, therefor.

In Column 1, Line 31, delete "(TCIC)," and insert -- (ICIC), --, therefor.

In Column 1, Line 31, delete "(eCIC)" and insert -- (eICIC) --, therefor.

In Column 4, Line 54, delete "WCD's" and insert -- WCD --, therefor.

In Column 7, Line 28, delete "a apparatus," and insert -- an apparatus, --, therefor.

In Column 9, Line 9, delete "equipped" and insert -- equipment --, therefor.

In Column 10, Line 29, delete "etc.)." and insert -- etc. --, therefor.

In Column 11, Line 47, delete "UE's in its cell. As the number of UE's" and insert -- UEs in its cell. As the number of UEs --, therefor.

In Column 11, Line 55, delete "TIE" and insert -- UE --, therefor.

In Column 14, Line 3, delete "UE are" and insert -- UE --, therefor.

In Column 14, Line 25, delete "6≠0" and insert -- 6≠0. --, therefor.

In Column 14, Line 38, delete "3≠0" and insert -- 3≠0. --, therefor.

Signed and Sealed this  
Twenty-seventh Day of November, 2018

Andrei Iancu  
*Director of the United States Patent and Trademark Office*

In Column 21, Line 48, delete "BS, etc.)" and insert -- etc.) --, therefor.

In Column 28, Line 5, delete "Indicator" and insert -- Indicator Channel --, therefor.

In the Claims

In Column 29, Line 3, in Claim 7, delete "of;" and insert -- of: --, therefor.

In Column 30, Line 36, in Claim 18, delete "The communication apparatus of claim" and insert -- The UE of claim --, therefor.